United States Patent
Pi

(10) Patent No.: US 9,971,927 B2
(45) Date of Patent: May 15, 2018

(54) FINGERPRINT SENSORS

(71) Applicant: Shenzhen Goodix Technology Co., Ltd., Shenzhen (CN)

(72) Inventor: Bo Pi, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days. days.

(21) Appl. No.: 15/289,179

(22) Filed: Oct. 9, 2016

(65) Prior Publication Data

US 2017/0039410 A1 Feb. 9, 2017

Related U.S. Application Data

(63) Continuation of application No. PCT/US2015/052722, filed on Sep. 28, 2015.

(60) Provisional application No. 62/056,348, filed on Sep. 26, 2014.

(51) Int. Cl.
*G06K 9/00* (2006.01)
*G06F 3/01* (2006.01)
*G06F 1/16* (2006.01)

(52) U.S. Cl.
CPC ....... *G06K 9/00053* (2013.01); *G06F 1/1643* (2013.01); *G06F 1/1694* (2013.01); *G06F 1/1698* (2013.01); *G06F 3/011* (2013.01); *G06F 3/017* (2013.01); *G06K 9/0004* (2013.01); *G06K 9/00026* (2013.01); *G06K 9/00067* (2013.01); *G06K 9/00087* (2013.01)

(58) Field of Classification Search
CPC ........... G06K 9/00053; G06K 9/00026; G06K 9/0004; G06F 1/1643; G06F 1/1694; G06F 1/1698; G06F 3/011; G06F 3/017
See application file for complete search history.

(56) References Cited

U.S. PATENT DOCUMENTS

| | | | |
|---|---|---|---|
| 8,743,082 B2 | 6/2014 | Ganapathi et al. | |
| 2007/0253608 A1 | 11/2007 | Tulyakov et al. | |
| 2013/0076485 A1* | 3/2013 | Mullins | G06F 21/32 340/5.83 |
| 2013/0329967 A1* | 12/2013 | Abiko | G06K 9/00026 382/115 |
| 2017/0017825 A1* | 1/2017 | Choi | G06K 9/00026 |

FOREIGN PATENT DOCUMENTS

| | | |
|---|---|---|
| KR | 10-2005-0010102 A1 | 1/2005 |
| KR | 10-2010-0119390 A1 | 11/2010 |
| WO | 2005/008568 A1 | 1/2005 |

* cited by examiner

*Primary Examiner* — David F Dunphy

(57) ABSTRACT

In one aspect, a method for registering a fingerprint profile on a mobile device includes detecting, at a fingerprint detection module having a rectangular shape, a contact from a finger associated with a swipe motion. The method includes responsive to the detected contact at the fingerprint detection module having a rectangular shape, capturing an image of the finger during the swipe motion. The method includes storing the image of the finger captured during the swipe motion as a registered fingerprint profile of an authorized user.

15 Claims, 28 Drawing Sheets

FIG. 17A Superframe

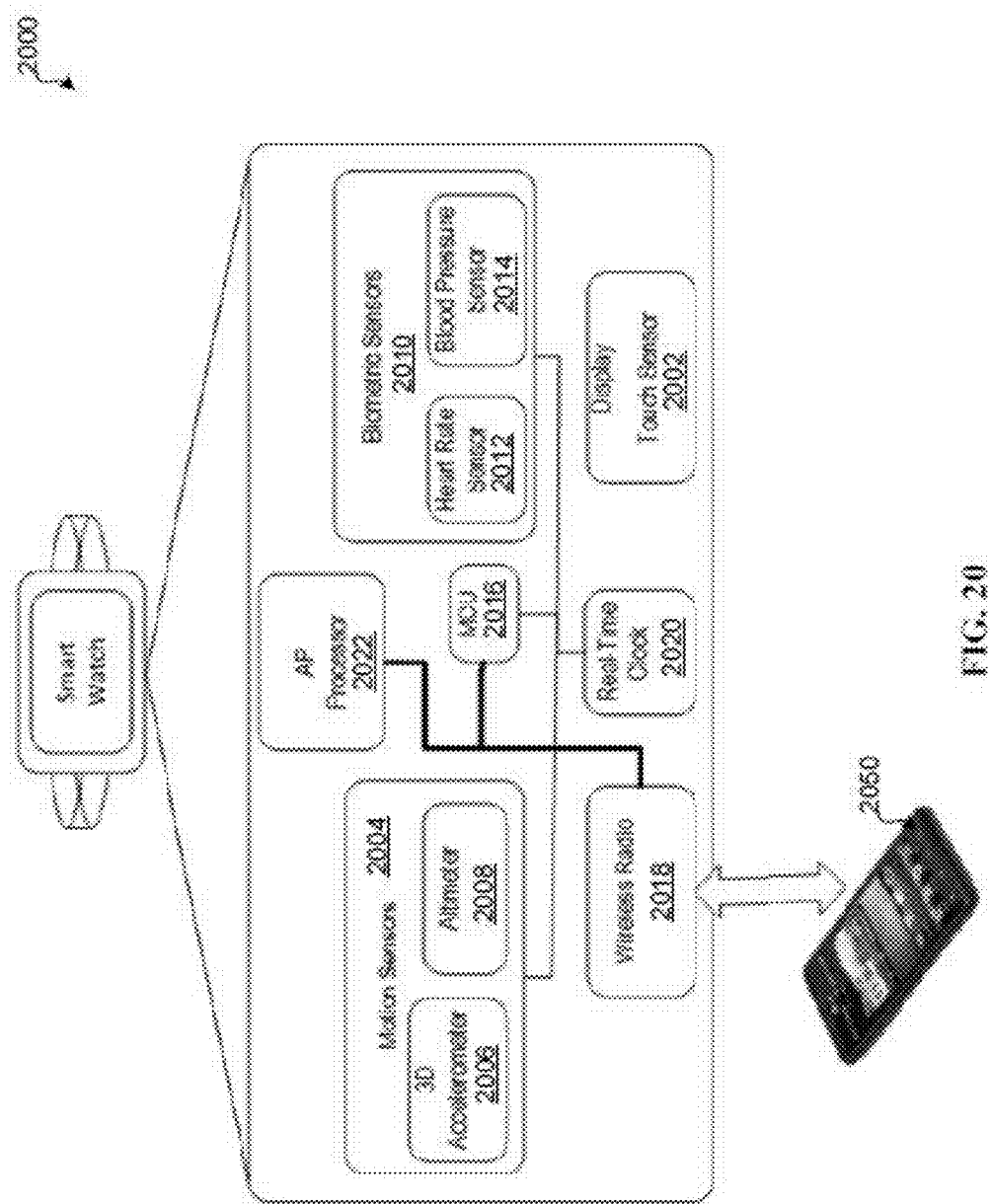

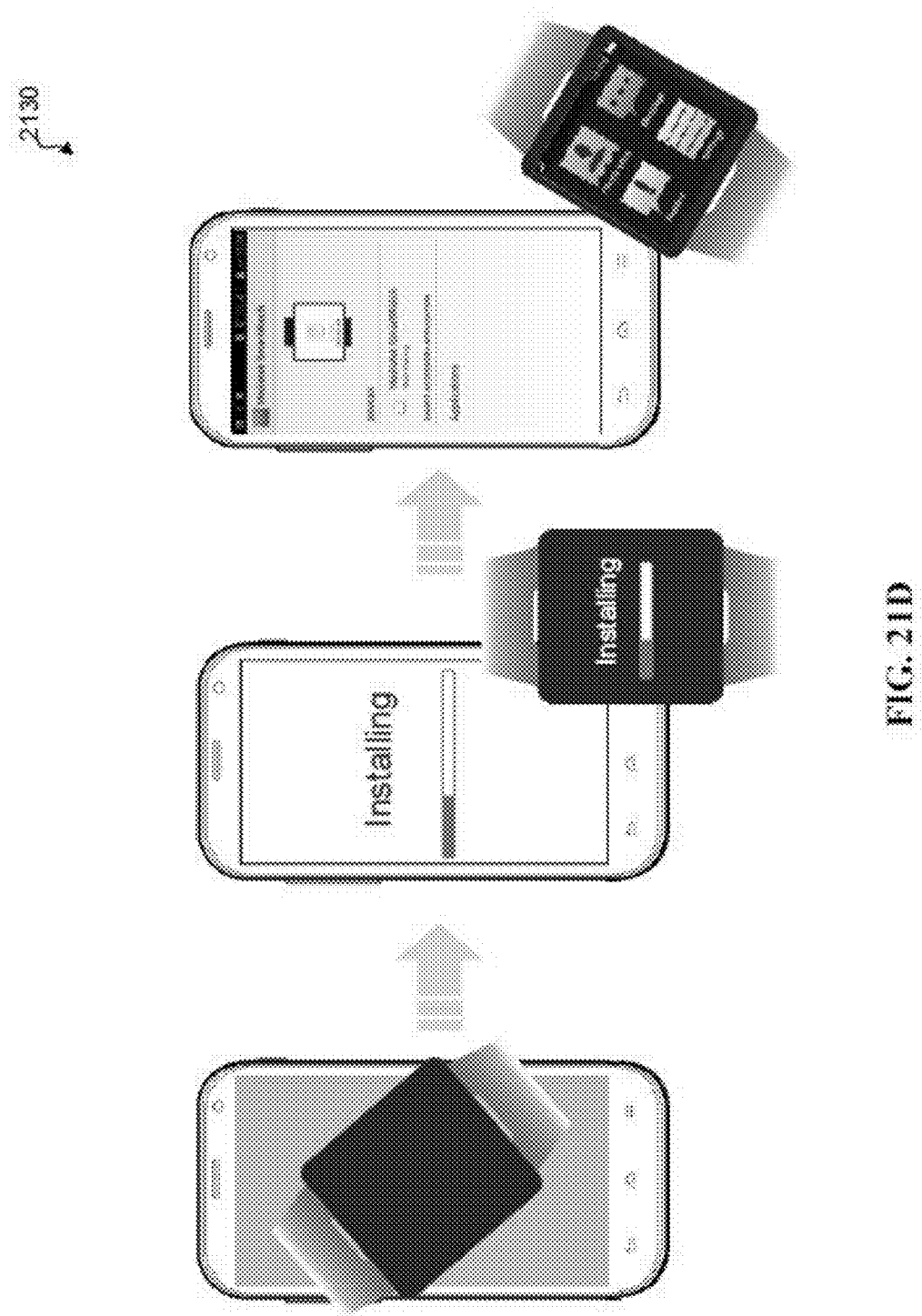

FINGERPRINT SENSORS

CROSS REFERENCE TO RELATED APPLICATIONS

The present application is a continuation of international application No. PCT/US2015/052722, filed on Sep. 28, 2015, which claims priority to U.S. Provisional Patent Application No. 62/056,348, filed on Sep. 26, 2014, both of which are hereby incorporated by reference in its entireties.

TECHNICAL FIELD

This present disclosure generally relates to fingerprint recognition, and in particular, relates to fingerprint recognition for securely accessing a mobile device and wearable devices.

BACKGROUND

Electronic devices including portable or mobile computing devices, such as laptops, tablets, smartphones, and gaming systems may employ user authentication mechanisms to protect personal data and prevent unauthorized access. User authentication on an electronic device may be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern.

SUMMARY

This present disclosure describes technology for providing devices, systems, and techniques that perform human fingerprint detection and authentication for authenticating an access attempt to a locked mobile device equipped with a fingerprint detection module. In another aspect, this present disclosure describes technology for wearable devices. In another aspect, techniques, systems and apparatus are described for implementing a smart watch that provides continuous sensing and combined sensor data from a combination of sensors, such as a motion sensor and a biometric sensor. The smart watch as described can correlate sensor data from multiple sensors and correlate the combined sensor data with an activity performed on a paired device. The collected combined sensor data and correlated data can be uploaded to a cloud server to provide relevant use feedback, perform statistical analysis and create cloud based services (e.g. sensor ratings) based on the collected combined sensor data.

In one aspect, a secure mobile device is disclosed to include a transparent top cover; a touch panel to receive touch input, the touch panel disposed below the transparent top cover; and a fingerprint detection module to capture an image of a finger making contact with the fingerprint detection module. The fingerprint detection module includes a top cover, a sensor array disposed below the top cover and arranged in columns of sensor pixels, integrating circuitry communicatively coupled to the sensor array and configured to simultaneously integrate sensor data received from multiple columns of sensor pixels.

The secure mobile device can be implemented in various ways to include one or more of the following features. For example, the fingerprint detection module can include a processor configured to identify a frequency to avoid a noise source. The fingerprint detection module can operate in a registration mode and an authentication mode. The fingerprint detection module can operate in the registration mode to capture a sequence of partial fingerprint images and stitch the sequence of partial fingerprint images together as a registered fingerprint image. The secure mobile device can include a memory module to store the registered fingerprint image. The fingerprint detection module can extract features from the sequence of partial fingerprint images and use the extracted features to stitch the sequence of partial fingerprint images together as a registered fingerprint image. The fingerprint detection module can operate in the registration mode to capture a sequence of partial fingerprint images from detected swipe motions. The fingerprint detection module can operate in the authentication mode to capture a partial fingerprint image. The fingerprint detection module can operate in the authentication mode to capture the partial fingerprint image from a detected touch motion. The fingerprint detection module can operate in the authentication mode to compare the captured partial fingerprint image with the stored registered image to determine a match. The fingerprint detection module can operate in the authentication mode to extract features from the captured partial fingerprint image to compare the extracted features from the captured partial fingerprint image with features in the stored registered image to determine the match. The fingerprint detection module can operate in the authentication mode to determine the match when a predetermined number of features are determined to be same. The extracted features include minutiae.

In another aspect, a method of authenticating a fingerprint image is disclosed. The method includes capturing, at a fingerprint detection module, an input fingerprint image to be authenticated. The method includes extracting features from the captured input fingerprint image. The method includes comparing the extracted features from the captured input fingerprint image with features from a registered fingerprint image. The method includes responsive to the comparing, determining whether the captured input fingerprint image matches the registered fingerprint image.

The method can be implemented in various ways to include one or more of the following features. For example, extracting the features includes extracting minutiae. Capturing the input fingerprint image includes capturing a single partial fingerprint image. The registered fingerprint image is a larger image than the captured input fingerprint image.

In another aspect, a wearable device is disclosed. The wearable device includes at least one motion sensor to sense motion data; at least one biometric sensor to sense biometric data; a microcontroller to control the motion and biometric sensors; a real-time clock to maintain time; a wireless radio to pair with an external device; and a display module. The microcontroller can analyze sensor data from two or more of the at least one motion sensor and the at least one biometric sensor to switch between multiple modes of operation.

The wearable device can be implemented in various ways to include one or more of the following features. For example, the wearable device can operate in a low power mode to always turn on user gesture detection. The wearable device can operate in an ultralow power mode to always turn on sensor data reporting to an external device. The wearable can communicate with a host device.

BRIEF DESCRIPTION OF THE DRAWINGS

FIG. 17A shows an exemplary superframe.

FIG. 20 is a diagram of an exemplary wearable device.

FIG. 21D is a diagram showing an exemplary easy smartwatch OOBE 2130.

Like reference symbols and designations in the various drawings indicate like elements.

DETAILED DESCRIPTION

Electronic devices equipped with fingerprint authentication mechanisms may be hacked by malicious individuals who can obtain the authorized user's fingerprint, and copy the stolen fingerprint pattern on a carrier object that resembles a human finger, which can then be used to unlock the targeted device. Hence, the fingerprint pattern, although a unique biometric identifier, may not be by itself a completely reliable or secure identification. The techniques, devices and systems described in this document improve upon the fingerprint authentication technology used in existing electronic devices to potentially prevent a stolen fingerprint from being used to gain access to the targeted device.

Principles of Capacitive Fingerprint Sensors

Figure 1A:
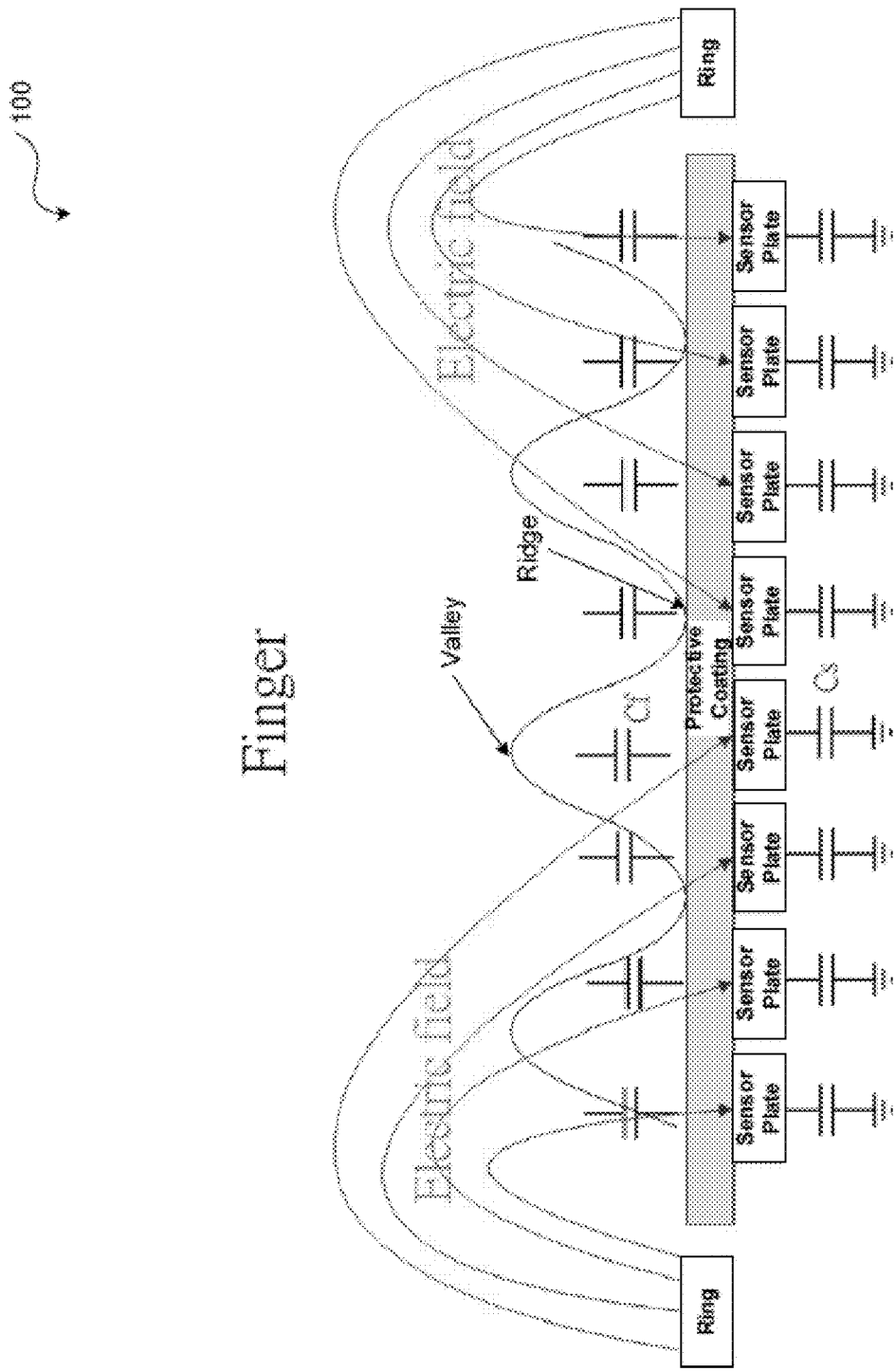
FIG. 1A shows an exemplary fingerprint sensor using a metallic ring to transmit (TX) signal.
Figure 1B:
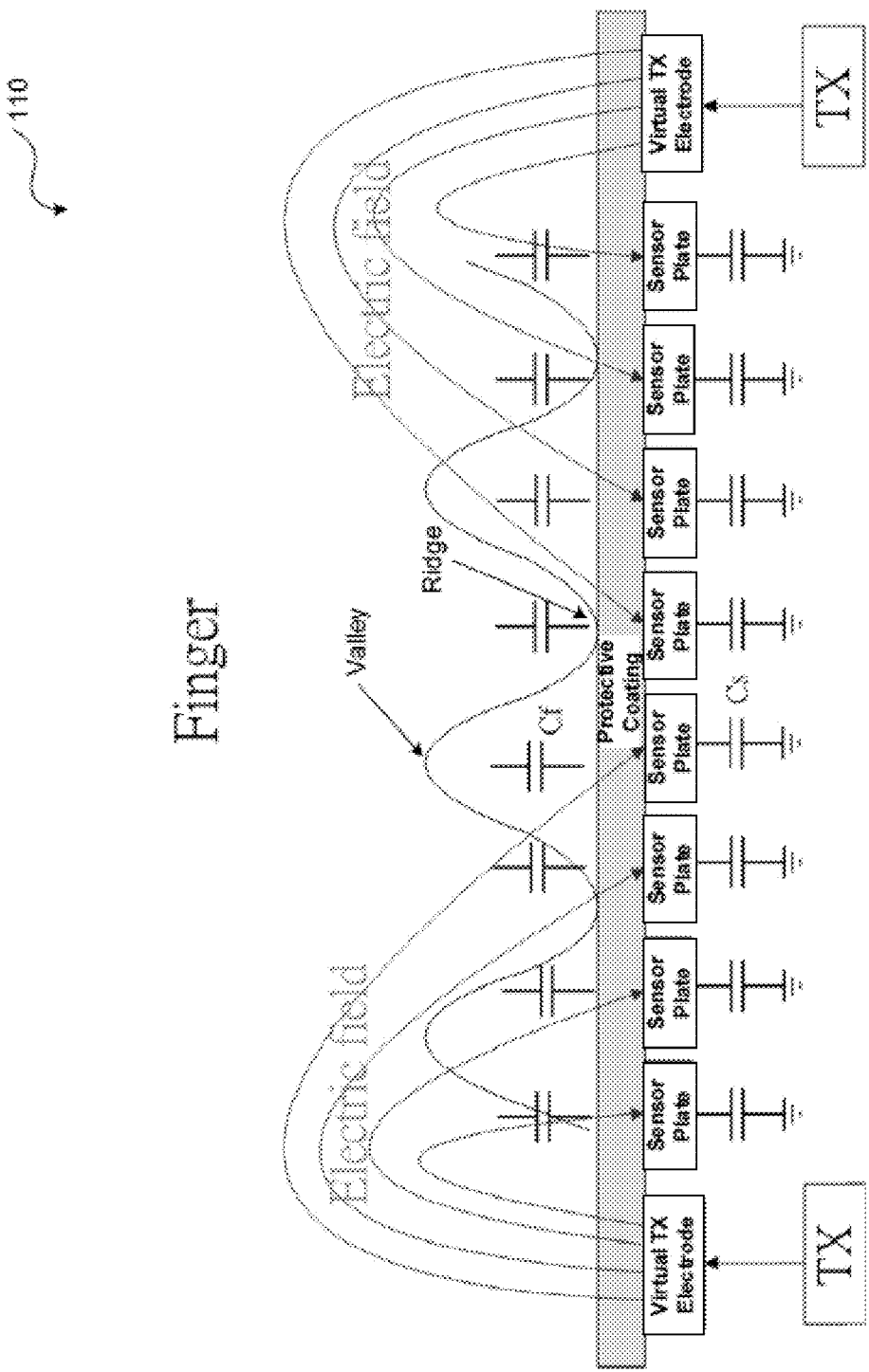
FIG. 1B shows an exemplary fingerprint sensor with no ring structure.
Figure 1C:
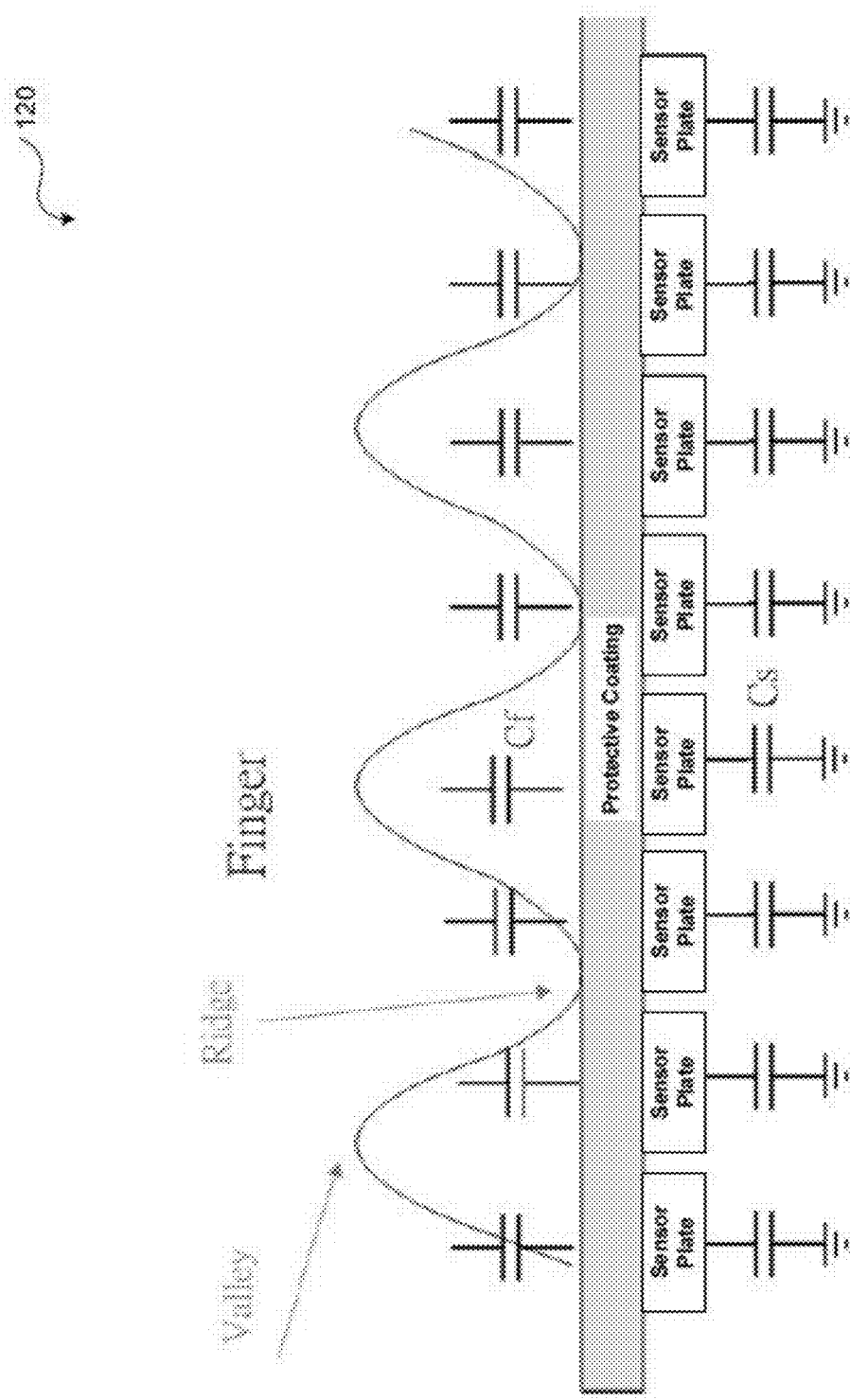
FIG. 1C shows another exemplary fingerprint sensor implementing a simpler structure.

The disclosed technology can be used to implement various types of fingerprint sensors as shown in FIGS. 1A, 1B, and 1C. A fingerprint sensor as disclosed in this present disclosure is a fingerprint detection module that includes an array of pixel sensors and corresponding circuitry. In one example, FIG. 1A shows an exemplary fingerprint sensor 100 using a metallic ring to transmit (TX) signal. The fingerprint sensor 100 can be implemented in any number of devices including a mobile device, such as a smart phone or a wearable device, such as a smartwatch. The fingerprint sensor 100 includes the metallic ring surrounding a protective coating of a dielectric material, such as a protective cover glass positioned over an array of sensor plates. The array of sensor plates includes capacitive sensors that form capacitors together with a finger when the finger is near the array of sensor plates. For example, when the finger touches the protective cover, the finger becomes the upper plate and the array of sensor plates below the protective coating become the lower plates of respective capacitors. The capacitors thus formed in response to the finger touch generate a capacitive signal sensed through the array of sensor plates. The capacitive signal includes Cf and Cs as shown in FIG. 1A. Depending on the locations of the ridges and valleys of the finger that correspond to the array of sensor plates, the individual capacitors formed by individual sensor plates will experience respective capacitance values that in combination can provide a three-dimensional image of the fingerprint including the details of the ridges and valleys.

The ring structure in FIG. 1A is used to transmit the TX signal. Exemplary electric field from the ring, through the finger, and to the array of sensor plates are also shown in FIG. 1A. In some embodiments, the metal ring or other similar conductive materials and structures placed around the protective cover and the array of sensor plates implemented on a mobile device and associated touch sensing circuitry communicatively coupled to the array of sensor plates can be used to detect a contact from an object on the metal ring protective cover. The fingerprint sensor 100 and the mobile device implementing the fingerprint sensor 100 can be activated from a power saving/standby mode with a light touch, without additional user input such as actuating a mechanical switch or button. However, in everyday uses when a user is holding or carrying (e.g., in a pocket close to the body) a mobile device, unintended and incidental contacts are common and can be difficult to avoid. It can be undesirable from power saving perspective if any contact by a finger or a part of the human body with the protective cover or the ring indiscriminately activates the fingerprint sensor or the mobile device from the power saving/standby mode. The disclosed technology enables light touch activations of the fingerprint sensor 100 while preventing or reducing unintended and incidental touches from activating the fingerprint sensor or the mobile device from the standby mode.

In addition, the thickness of the protective cover (e.g., 200 µm~300 µm) can cause the capacitive signal to be weak. Advance signal processing may be needed to detect the weak signal.

FIG. 1B shows an exemplary fingerprint sensor 110 with no ring structure. The fingerprint sensor 110 is similar to the fingerprint sensor 100 in FIG. 1A including the array of sensor plates arranged below protective cover. Rather than using the ring structure that surround the protective cover, the fingerprint sensor 110 includes one or more virtual TX electrodes that transmit the TX signal through the finger and onto the array of sensor plates. The virtual TX electrode is disposed below the protective cover rather than at the same vertical level as the protective cover, which is how the ring was disposed in the fingerprint sensor 100. The protective cover can have a thickness of 200 μm to 300 μm for example, and similar to the protective cover in the fingerprint sensor 100. Because the ring structure is not needed, the fingerprint sensor can be merged with the touch display panel design for a visually seamless appearance.

FIG. 1C shows another exemplary fingerprint sensor 120 implementing a simpler structure. The fingerprint sensor 120 is substantially similar to the fingerprint sensors 100 and 110 including an array of sensor plates disposed below the protective cover. However, the fingerprint sensor 120 having the simpler structure does not include the ring or the virtual TX electrode. The fingerprint sensor 120 can measure self-capacitance of the array of sensor plates. The protective cover can have a thickness of 200 μm~300 μm similar to the protective covers of FIGS. 1A and 1B. Due the thickness of the protective cover, the capacitive signal can be weak. Thus, advanced or sophisticated signal processing circuitry can be used to detect and process the weak signal.

Fingerprint Sensor Design

Figure 2A:
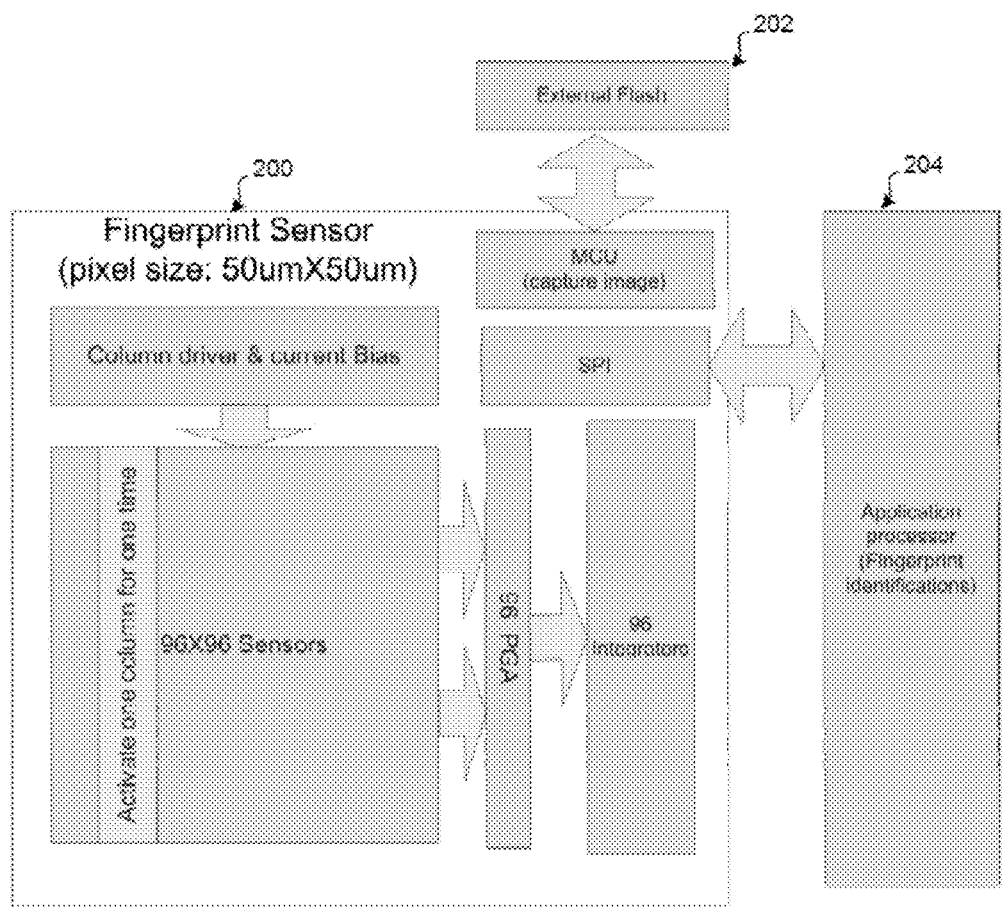
FIGS. 2A, 2B, and 2C show an exemplary fingerprint sensor design.
Figure 2B:
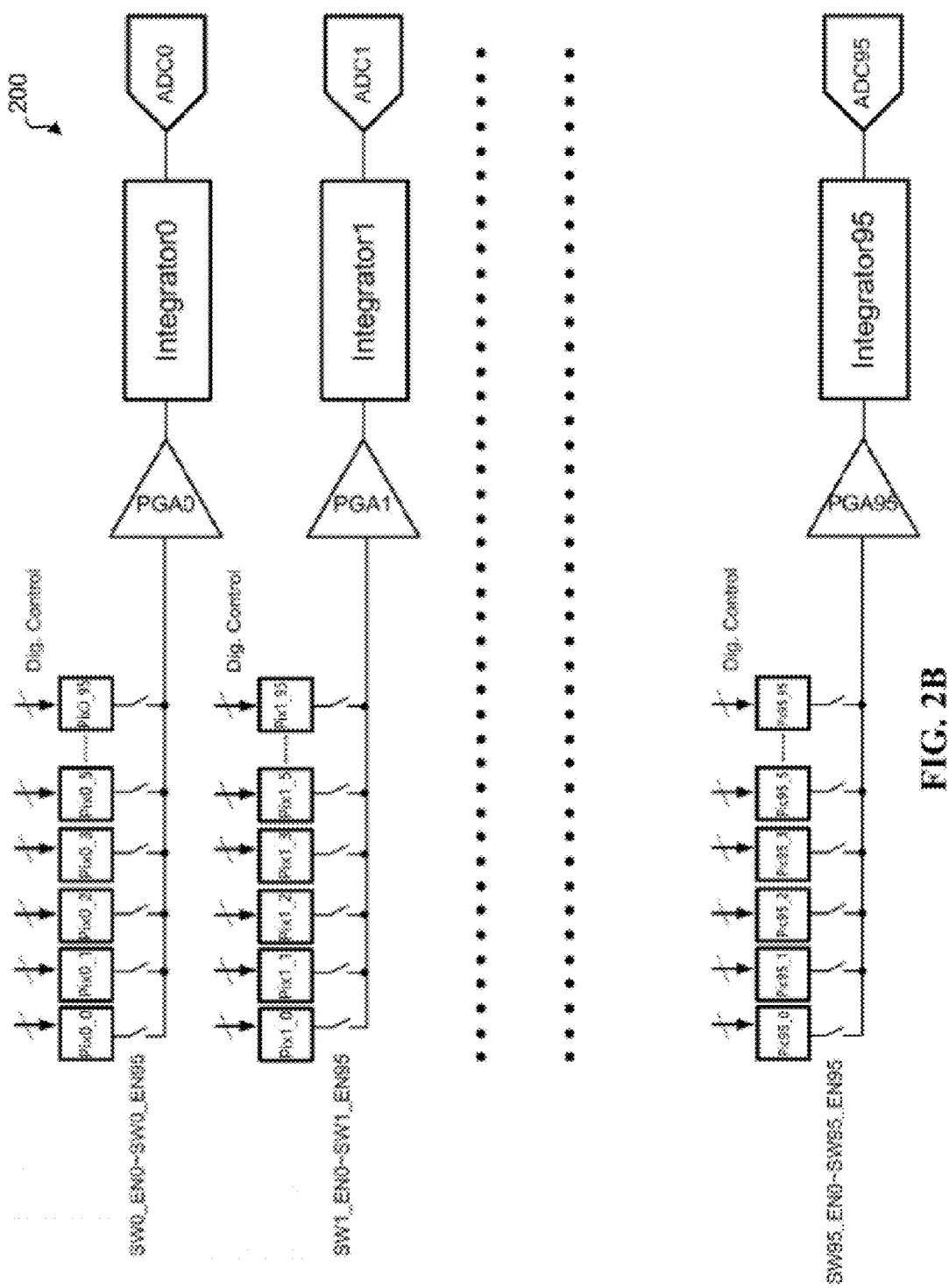
Figure 2C:
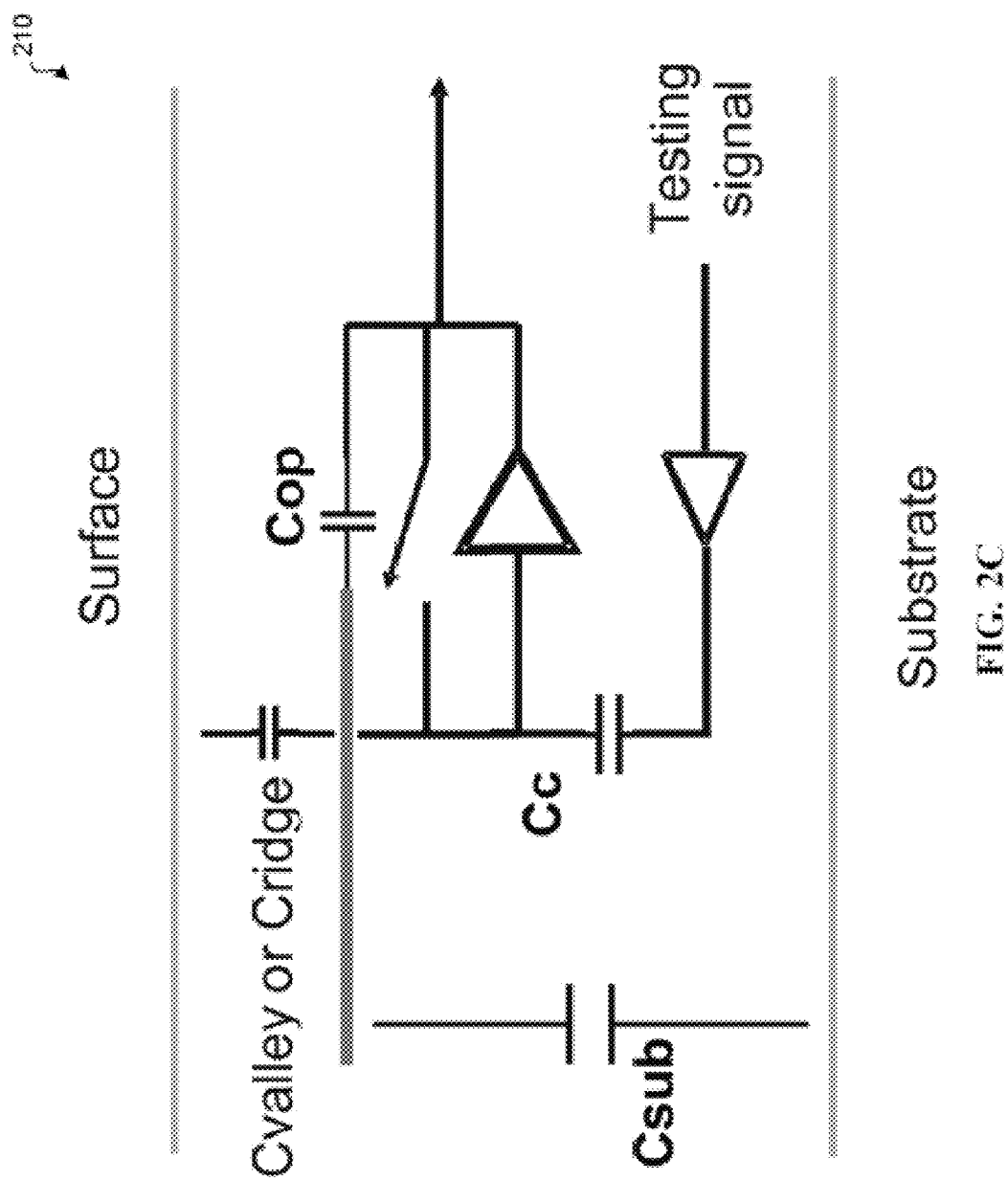

FIGS. 2A, 2B, and 2C show an exemplary fingerprint sensor design. FIG. 2A shows an exemplary fingerprint sensor 200. FIG. 2B is a diagram showing exemplary coupling between columns of pixel sensors, PGA, Integrator and analog-to-digital converters (ADC). FIG. 2C is a diagram showing an exemplary pixel sensor 210. FIG. 2A shows an exemplary fingerprint sensor 200 interacting with an external memory, such as flash memory 202 and an application processor 204 for performing fingerprint identification using the data received from the fingerprint sensor 200. The fingerprint sensor 200 can include any number of pixel sensors having a predetermined pixel size, such as 50 μm×50 μm. The fingerprint sensor 200 can include an array of sensors arranged in columns and rows. In the example shown in FIG. 2A, 96 columns and 96 rows of pixel sensors are implemented to communicate with a column driver & current bias controller. In some implementations the column driver & current bias controller can activate one column of sensors at a time. In other implementations, any number of columns can be activated at a time.

The fingerprint sensor 200 can include a programmable gate array (PGA) to receive the signals outputs from the array of sensors. In the example shown in FIG. 2A, 96 PGA can be used to receive the 96 signal outputs from the 96 columns of sensors. The output of the PGA is received by integrators to process the signals from the array of sensors. In the example shown in FIG. 2A, 96 integrators corresponding to the 96 PGA are shown. The processed signal outputs from the array of sensors are communicated to the application processor through a system processor interface (SPI). FIG. 2B is a block diagram of the fingerprint sensor 200 showing an exemplary coupling between the columns of pixels sensors, the PGA, the integrator, and the analog to digital converter (ADC). Each PGA couples with a corresponding row member of the columns of the array of pixels sensors. For example, PGA0 can selectively couple with any of the zeroth row member of the columns of the pixel sensors Pix0_0, Pix0_1, Pix0_2, Pix0_3, Pix0_4, Pix0_5 . . . Pix0_95 using switches SW0_EN0 through SW0_EN95. PGA) couples with Integrator 0 and ADC0 to represent the zeroth row or row 0 of the columns 0 through 95 of pixel sensors. Similarly, PGA1 can selectively couple with any of the 1st row member of the columns of the pixel sensors Pix1_0, Pix1_1, Pix1_2, Pix1_3, Pix1_4, Pix1_5 . . . Pix1_95 using switches SW1_EN0 through SW1_EN95. PGA1 couples with Integrator1 and ADC1 to represent the 1st row or row 1 of the columns 0 through 95 of pixel sensors. Similar row by row coupling continues for all 96 rows.

The fingerprint sensor 200 can include a local processor, such as a microcontroller unit (MCU). The SPI can also communicate with the MCU to provide the sensor data to the MCU. The MCU can capture an image of the fingerprint using the received sensor data. The MCU can output the generated image to the external flash memory 202. When capturing the fingerprint image, the fingerprint sensor can perform noise avoidance or cancellation to enhance the weak sensor signal. For example, the fingerprint sensor 200 can check for the existence of any external noise or interference at any frequency. The fingerprint sensor 200 can apply a clear frequency free of noise and interference to capture the fingerprint image.

Fingerprint Registration and Identification

Figure 3:
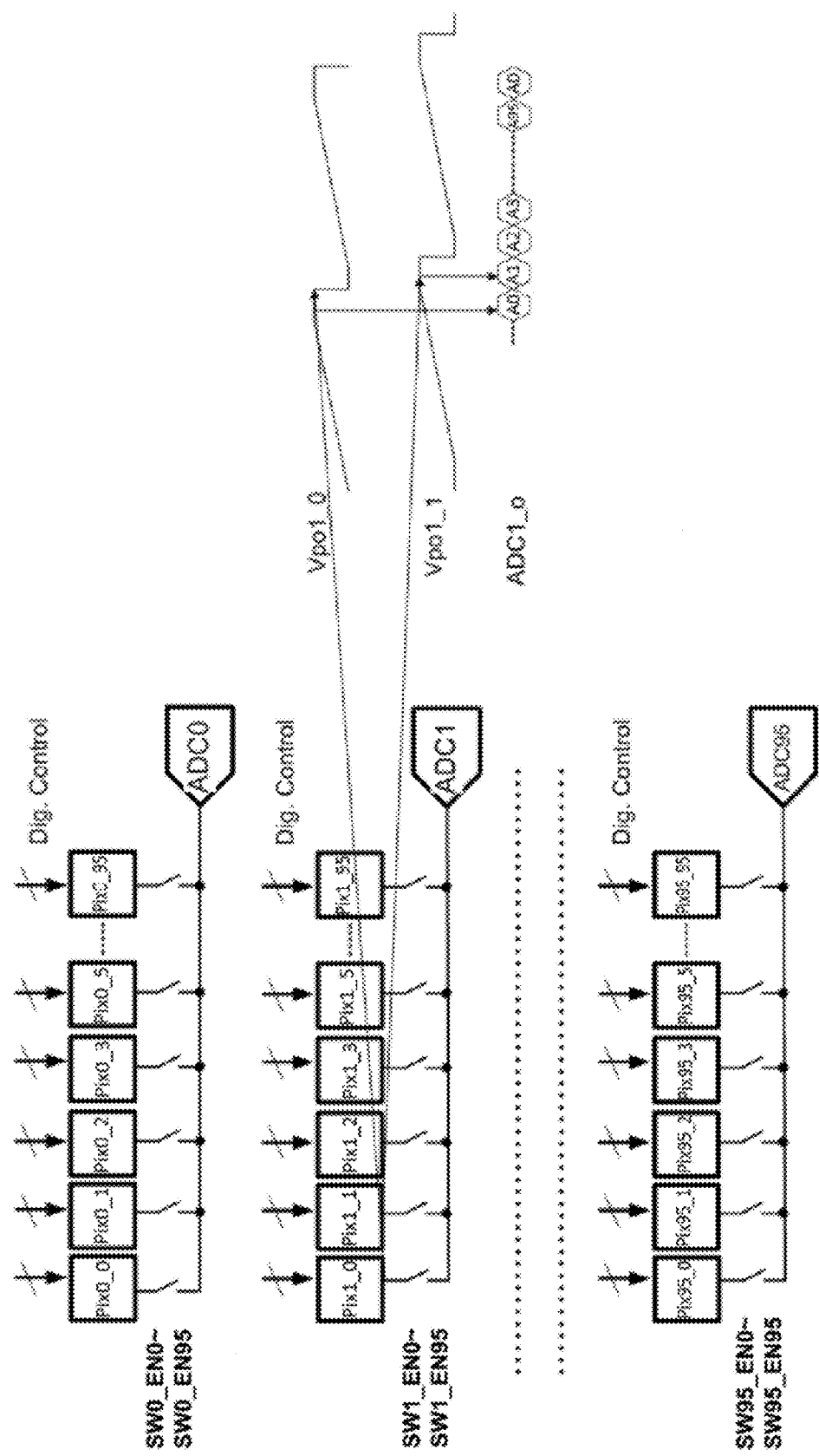
FIG. 3 is a diagram showing an exemplary fingerprint sensor for integrating multiple columns of pixel sensor signals simultaneously.

FIG. 3 is a diagram showing an exemplary fingerprint sensor 300 for integrating multiple columns of pixel sensor signals simultaneously. Integrating multiple columns of pixel sensors simultaneously will improve the signal-to-noise ratio (SNR) significantly. By integrating multiple pixel sensor signals rather than integrating a column at a time, a fingerprint identification algorithm can be implemented for full-finger image capture.

Fingerprint identification can be implemented from the captured full-finger image. Features of the fingerprint can be extracted from the captured image. The extracted features can be matched to the registered features of a valid user's fingerprint. Then the captured images can be stitched together to obtain the full-finger image.

Figure 4:
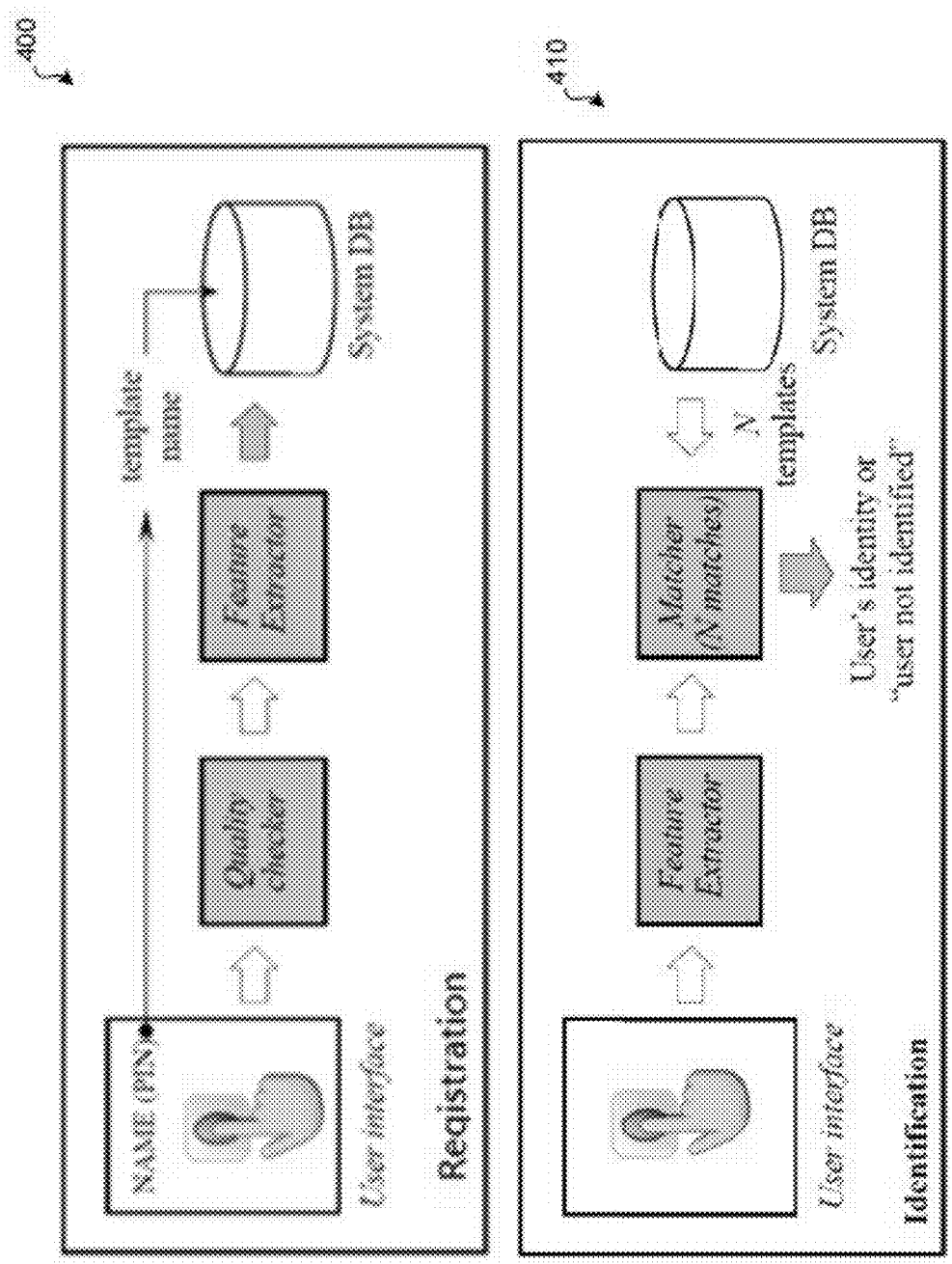
FIG. 4 shows an exemplary registration and an exemplary identification processes.

Fingerprint identification includes two stages: registration and identification. FIG. 4 shows an exemplary registration 400 and an exemplary identification 410 processes. Features used in traditional methods are the minutiae extracted from fingerprints. During the registration stage 400, a user's fingerprint is captured using a user interface that instructs the user to apply the user's finger on the fingerprint sensor. The user may be instructed to scan different parts of his finger across the fingerprint sensor in a different manner in order to capture enough of the fingerprint data. A Quality Checker can verify the quality of the scanned data during each scan. Depending on the detected quality of each scan, the additional number of scans required from the user may increase or decrease. From the captured scanned images, a Feature Extractor extracts various features of the fingerprint off of the captured scanned images. The extracted features are stored in a database for later matching during the identification stage.

During the identification stage 410, a user attempts to gain access to a mobile device integrated with the fingerprint sensor by validating the user's fingerprint. The user may be instructed to provide a scan of the user's fingerprint through a user interface. The user may be required to maintain contact on the fingerprint sensor to continue the scan while the Feature Extractor extracts various fingerprint features from the scanned images. A Matcher takes the extracted fingerprint features obtained during the identification scan and attempts to match the features against the stored features of the valid user's fingerprint. When the Matcher completes a predetermined N matches during the feature comparison, the Matcher determines that the user is a valid user. When less than the required predetermined N matches are found, the Matcher determines that the user is not a valid user.

Figure 5:
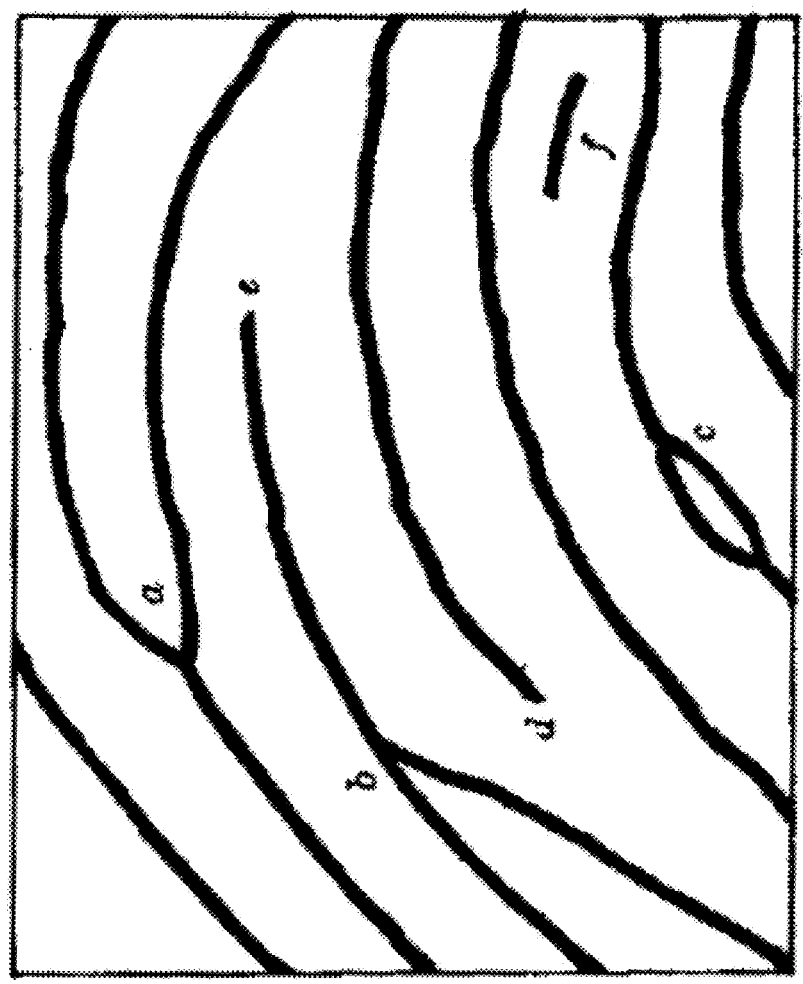
FIG. 5 shows an exemplary fingerprint image.
Figure 6:
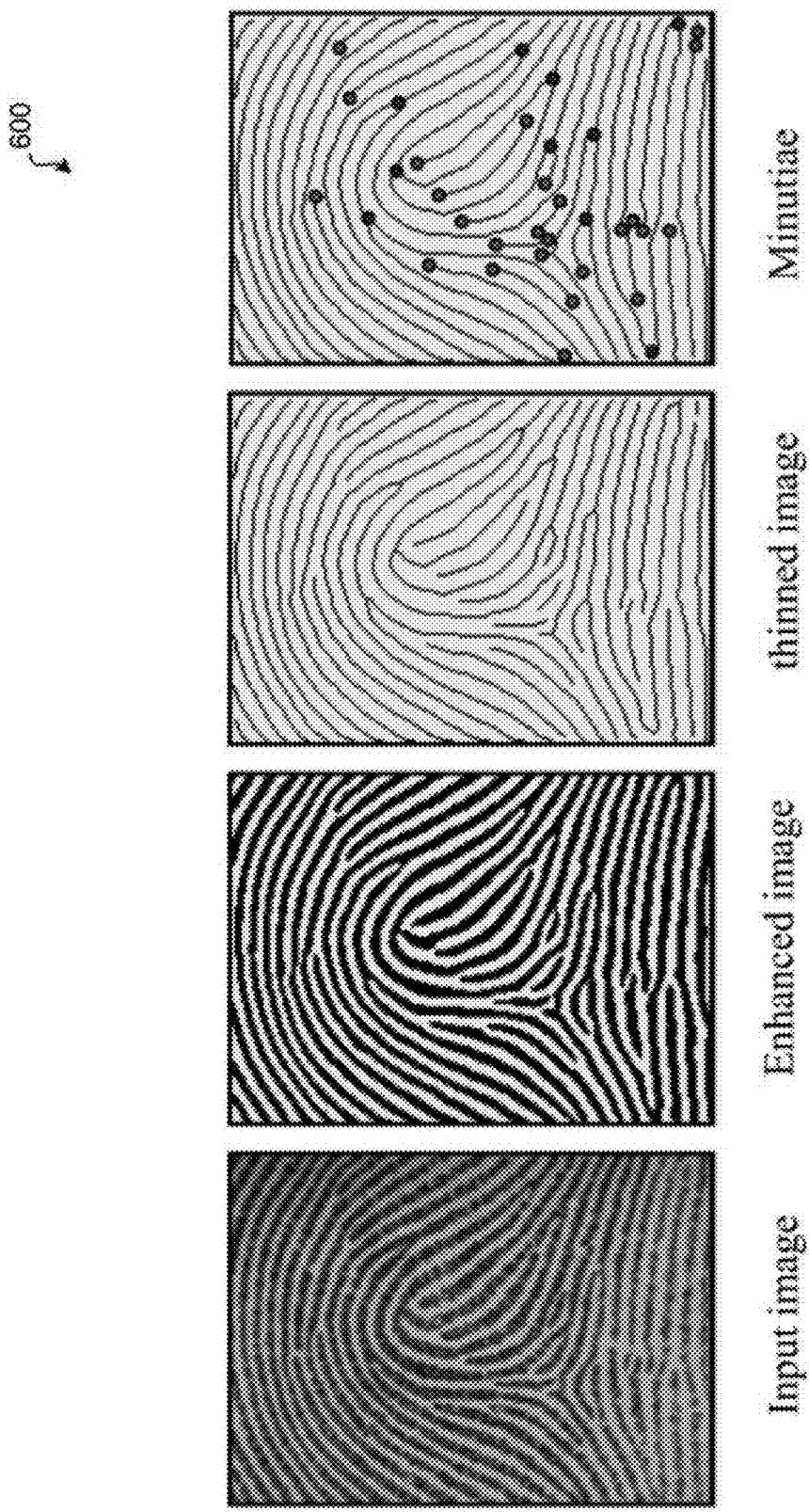
FIG. 6 shows a typical feature extracting process.
Figure 7:
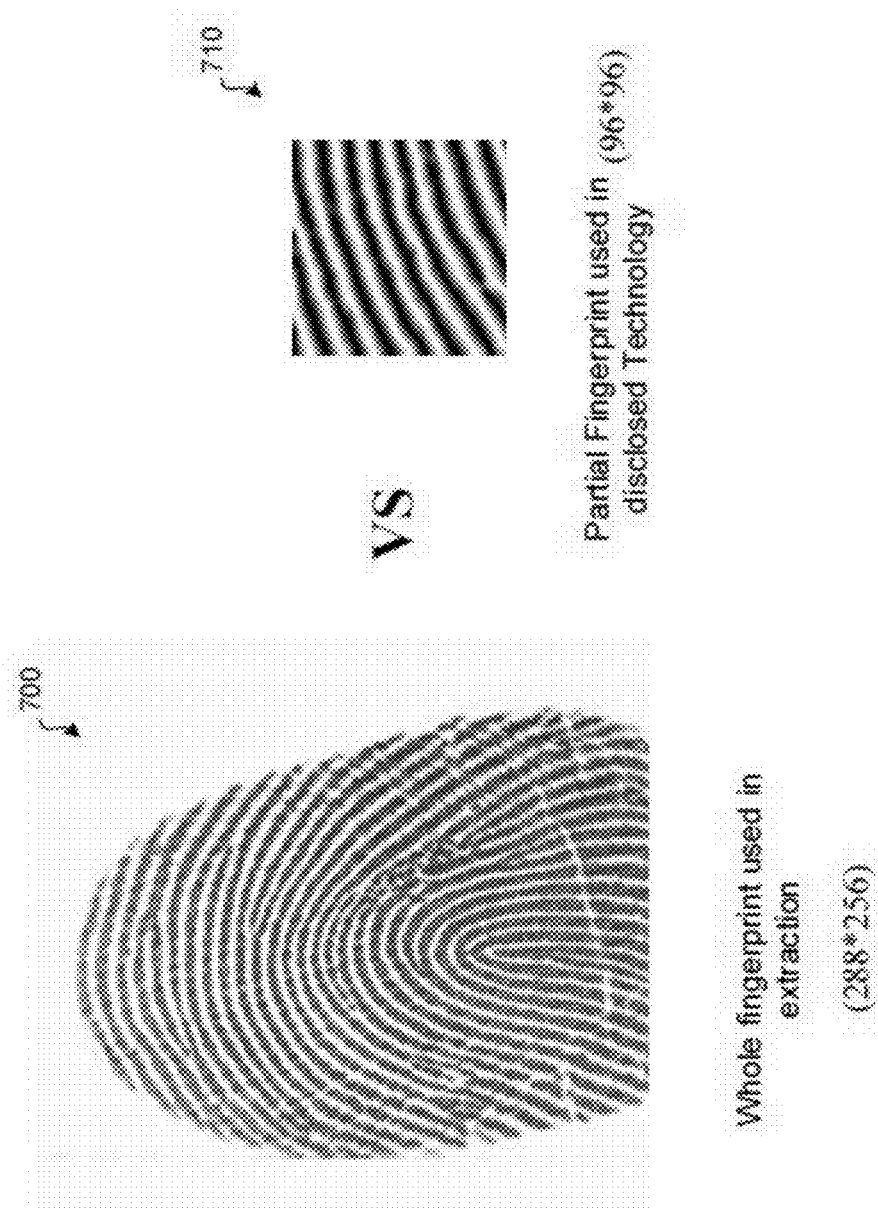
FIG. 7 shows an entire fingerprint image used in feature extraction verse a partial fingerprint image used in feature extraction of the disclosed technology.

FIG. 5 shows an exemplary fingerprint image 500. In the image shown in FIG. 5, features a, b, c, d, e, and f are minutiae. A typical feature extracting process 600 is shown in FIG. 6. An input image is enhanced to obtain an enhanced image. The enhanced image is further processed to obtain a thinned image. The minutiae are identified on the thinned image. FIG. 7 shows an entire fingerprint image 700 used in feature extraction verse a partial fingerprint image 710 used in feature extraction of the disclosed technology. To ensure a high enough number of minutiae, the input fingerprint image needs to be big in size, such as the entire fingerprint image 700 shown on the left side of FIG. 7. Rather than use the big entire image, the disclosed technology uses a small partial fingerprint image 710 with few minutiae.

Figure 8:
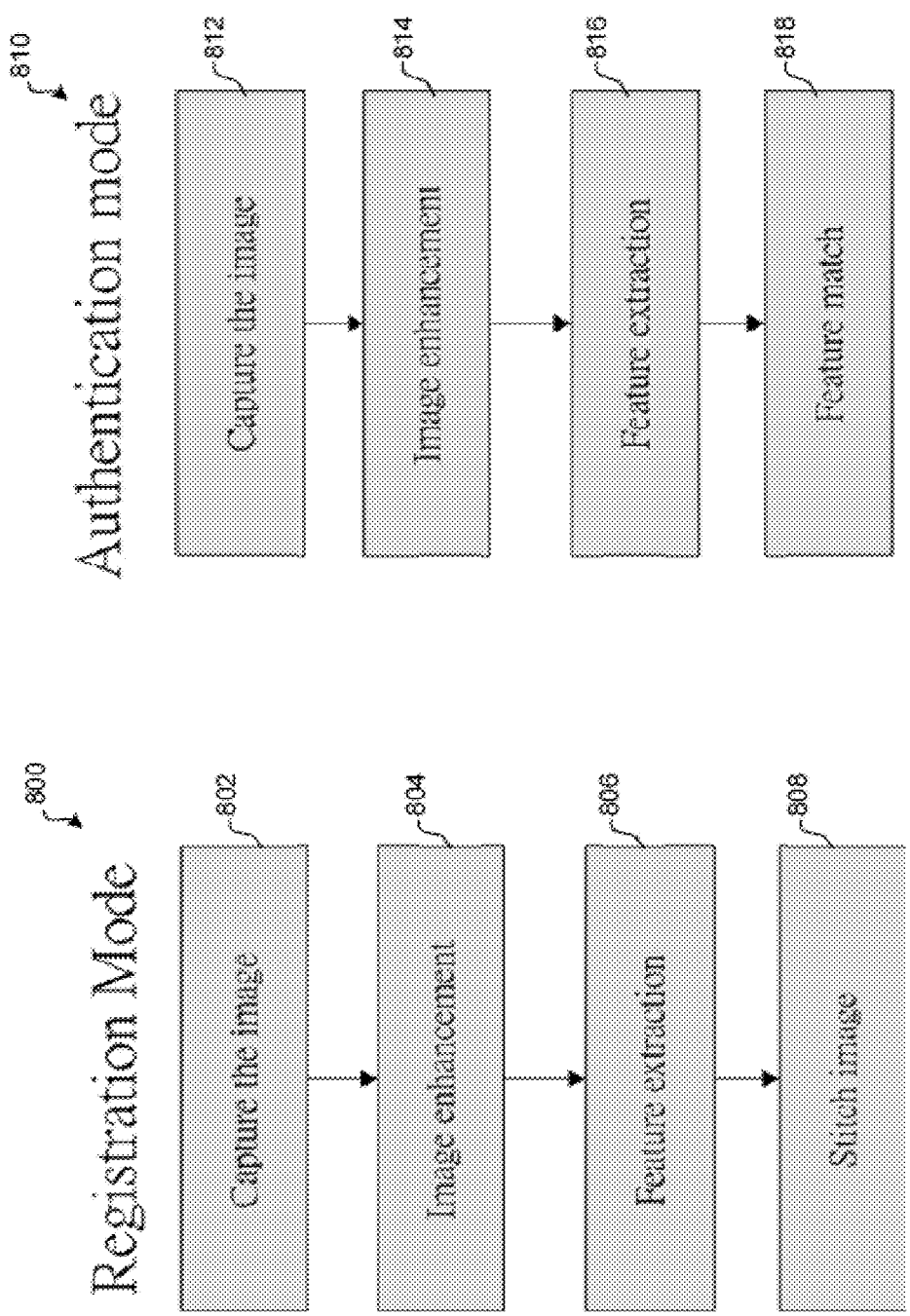
FIG. 8 is process flow diagram for an exemplary registration process and an exemplary identification or authentication process.

FIG. 8 is process flow diagram for an exemplary registration process 800 and an exemplary identification or authentication process 810. The registration process 800 includes a capture mode 802 capture the images of the fingerprint image for registration. A number of different images may be required to be captured. The captured images are enhanced 804. Features of the fingerprint are extracted from the enhanced images 806. The captured images are stitched together to obtain the fingerprint image for registration. The extracted features are stored in a database as the registered features of a valid user.

The authentication or identification process 810 includes capturing the image of the finger 812. During the authentication, a single image can be enough. The image captured can be as small as the image 710 shown in FIG. 7. The captured image is enhanced 814 to obtain an enhanced image. Features are extracted from the enhanced image 816. The extracted features are compared against the stored extracted features to obtain feature matches 818. When a predetermined N number of features match, the user's fingerprint is authenticated as matching the registered user.

A fingerprint image contains some single tone in spatial domain. A 2D-FFT filter can be used to enhance the major tone. See Equation 1 below:

$$G(x, y) = F^{-1}\{F(u,v) \times |F(u,v)|^k\}, \quad \text{Equation 1}$$

F(u, v) is input image array,
G(x, y) is filtered image array.

The features used in the registration and authentication processes include a number of attributes. Non-limiting examples can include rotational invariance, displacement invariance, contrast and brightness invariance, and numerous features. A single feature can contain 128 bytes of data. There can be on average 100~200 features in a 96×96 image.

Also, a feature descriptor can be used. For example, a statistic of Gradient or Hessian or Wavelet or other vector surrounding features can be used. The feature descriptor is a high dimensional vector (e.g., 128 dimensions). The nearest neighbor can be found within a minimum Euclidean distance. See Equation 2 below:

$$E_{k,j} = \sqrt{\sum_{i=0}^{N}(I_{k,i} - R_{j,i})^2}, \quad \text{Equation 2}$$

where $I_k$ is the k-th feature of input fingerprint
$R_j$ is the j-th feature of registered fingerprint
$E_{k,j}$ is the euclidean distance between feature $I_k$ and $R_j$, N is the dimension of feature descriptor.

Figure 9:
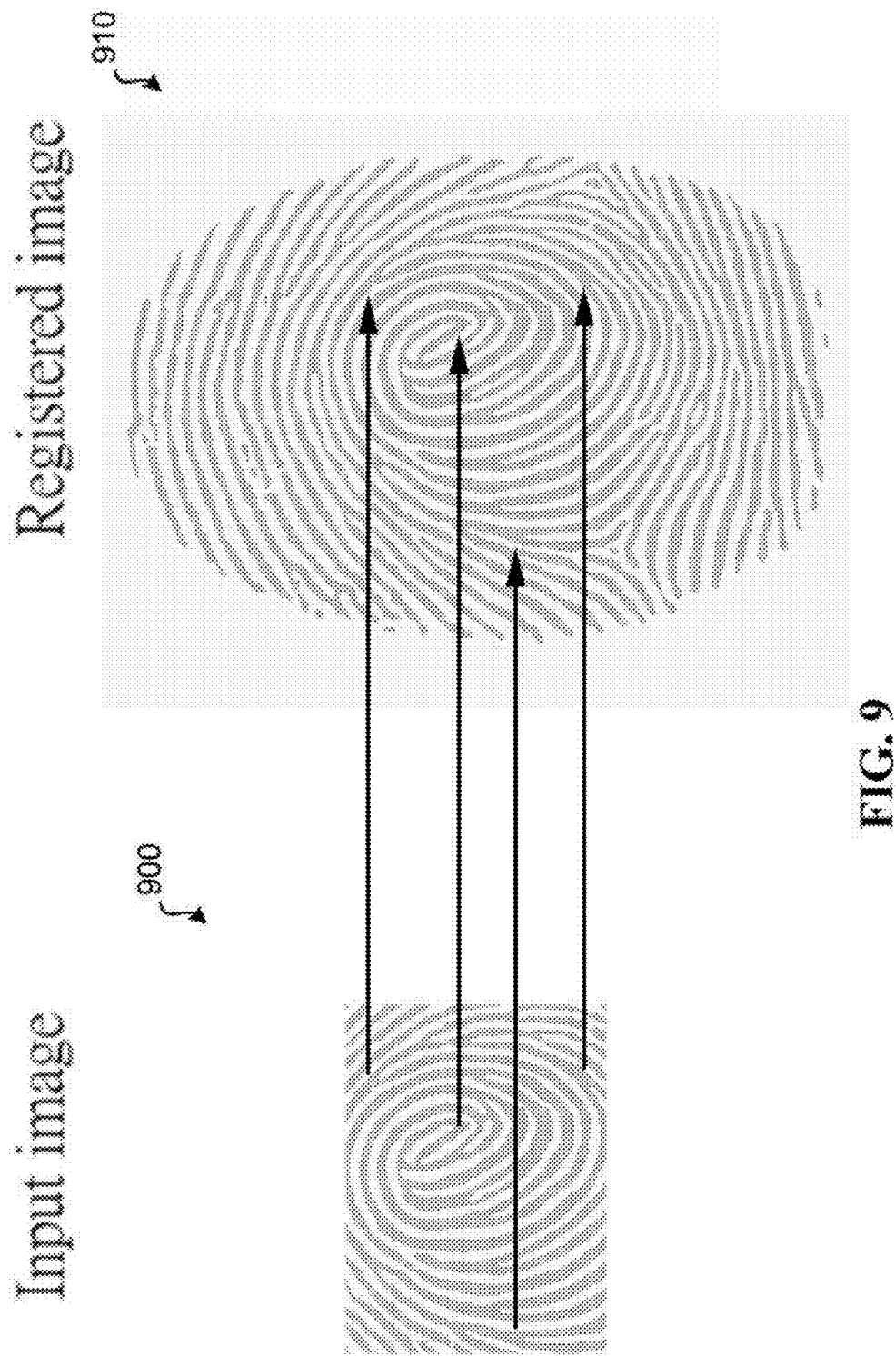
FIG. 9 is a diagram illustrating an exemplary process for feature matching.
Figure 10:
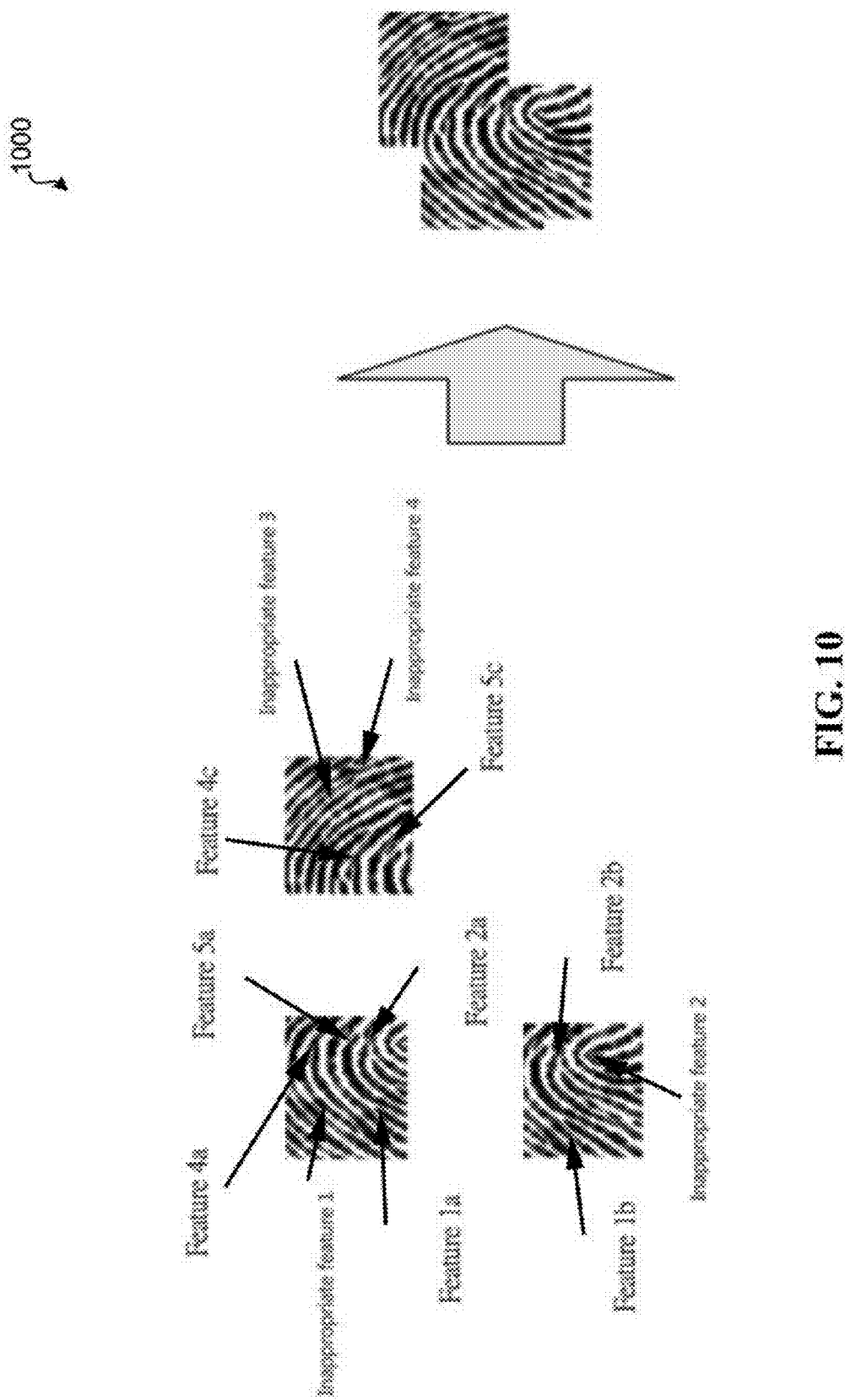
FIG. 10 is a diagram showing exemplary features and inappropriate features on the images.

FIG. 9 is a diagram illustrating an exemplary process for feature matching. On the left, an input image 900 is shown and on the right, the registered image 910 is shown. The input image 900 is a partial image. The lines between the input image 900 and the registered image 910 show the matching features. During the feature matching, the same features are identified between the registered fingerprint image 910 and the input fingerprint image 900 and the inappropriate features are filtered out. The transformation model is calculated from the input features to the registered features. The input image is transformed by finding a transformation model and stitching the transformed image into the registered image. The processes of identifying the same features, filtering the inappropriate features, calculating the transformation model, and transforming the input image are repeated for multiple input images to complete a full finger image. FIG. 10 is a diagram showing exemplary features and inappropriate features on the images.

Hybrid Registration & Authentication Scheme

Figure 11:
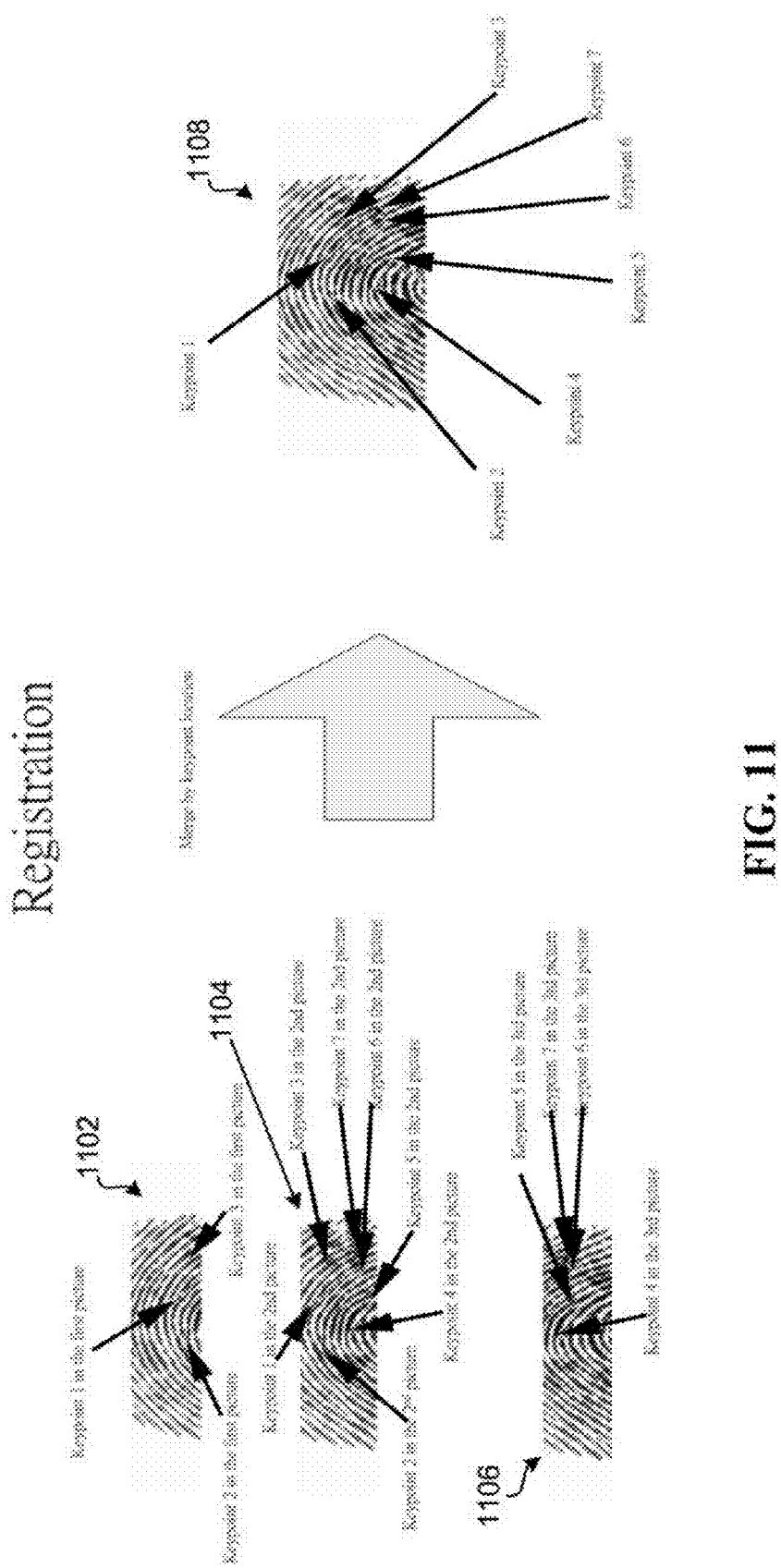
FIG. 11 is a diagram of an exemplary registration process using a swipe motion.

Typically, a user may need to press his finger over the fingerprint sensor multiple times to complete the registration process. A swiping type of fingerprint sensor can be much more user-friendly for registration. However, the swiping type of fingerprint sensor may not friendly on authentication mode. FIG. 11 is a diagram of an exemplary registration process 1100 using a swipe motion. A fingerprint is registered by a swiping motion of the finger. However, authentication is performed using a touching motion. In FIG. 11, three input images 1102, 1104, and 1106 are captured using a swipe motion. Keypoints 1, 2, and 3 are identified in the first image 1102. The same Keypoints 1, 2, and 3 are also identified in the second image 1104. In addition, Keypoints 4, 5, 6, and 7 are identified in the second image. In the third image 1106, the same Keypoints 4, 5, 6, and 7 are identified. The separate images 1102, 1104, and 1106 are merged together by the identified Keypoints that overlap among the images to obtain the merged image 1108.

Figure 12:
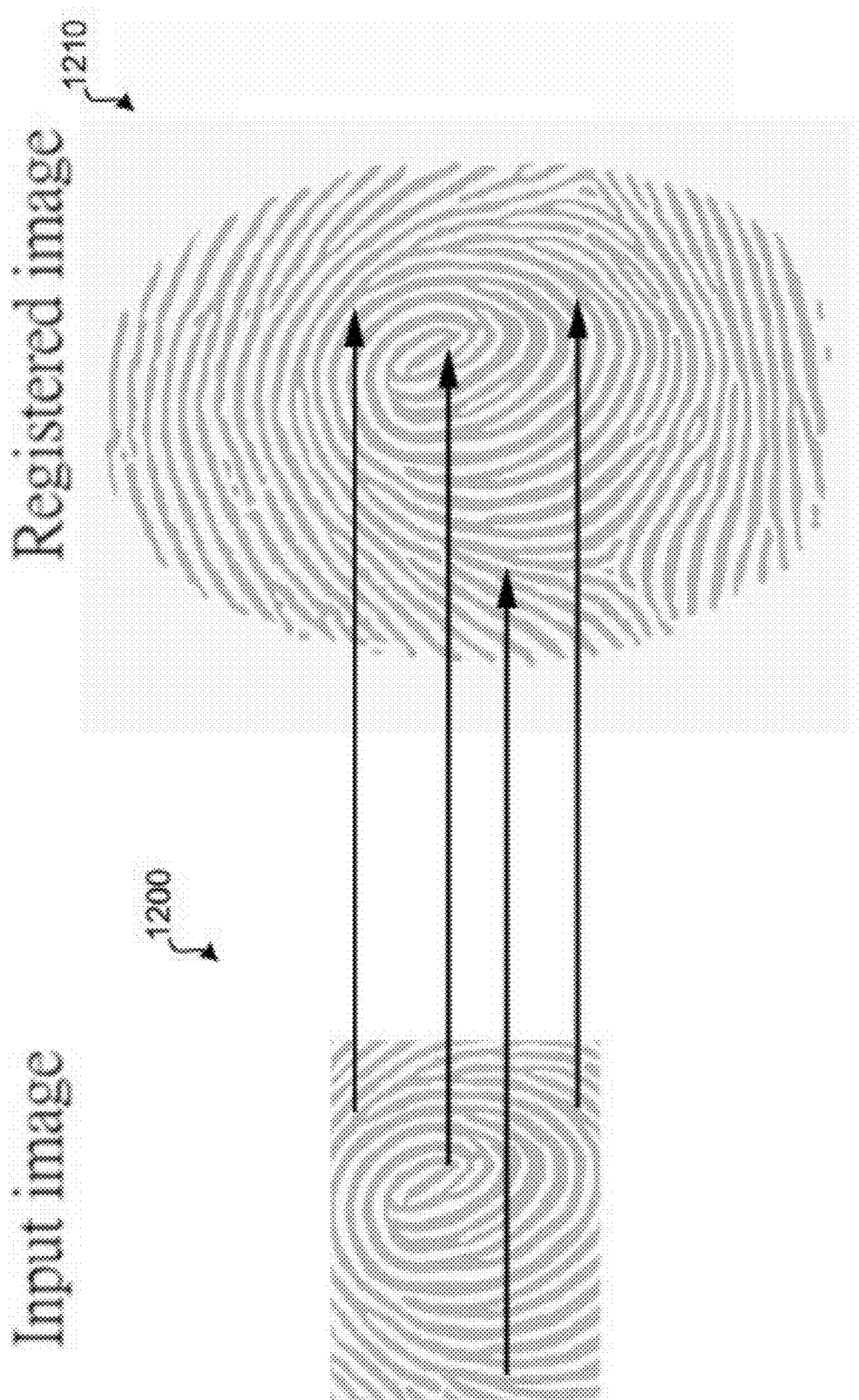
FIG. 12 shows matching between an input image and a registered image during authentication.

FIG. 12 shows matching between an input image and a registered image during authentication. The lines between the input image 1200 and the registered image 1210 show the matched features. Authentication is performed using a touch motion to obtain the input image in contrast to the swipe motion used during registration.

Link Protocol

Figure 13:
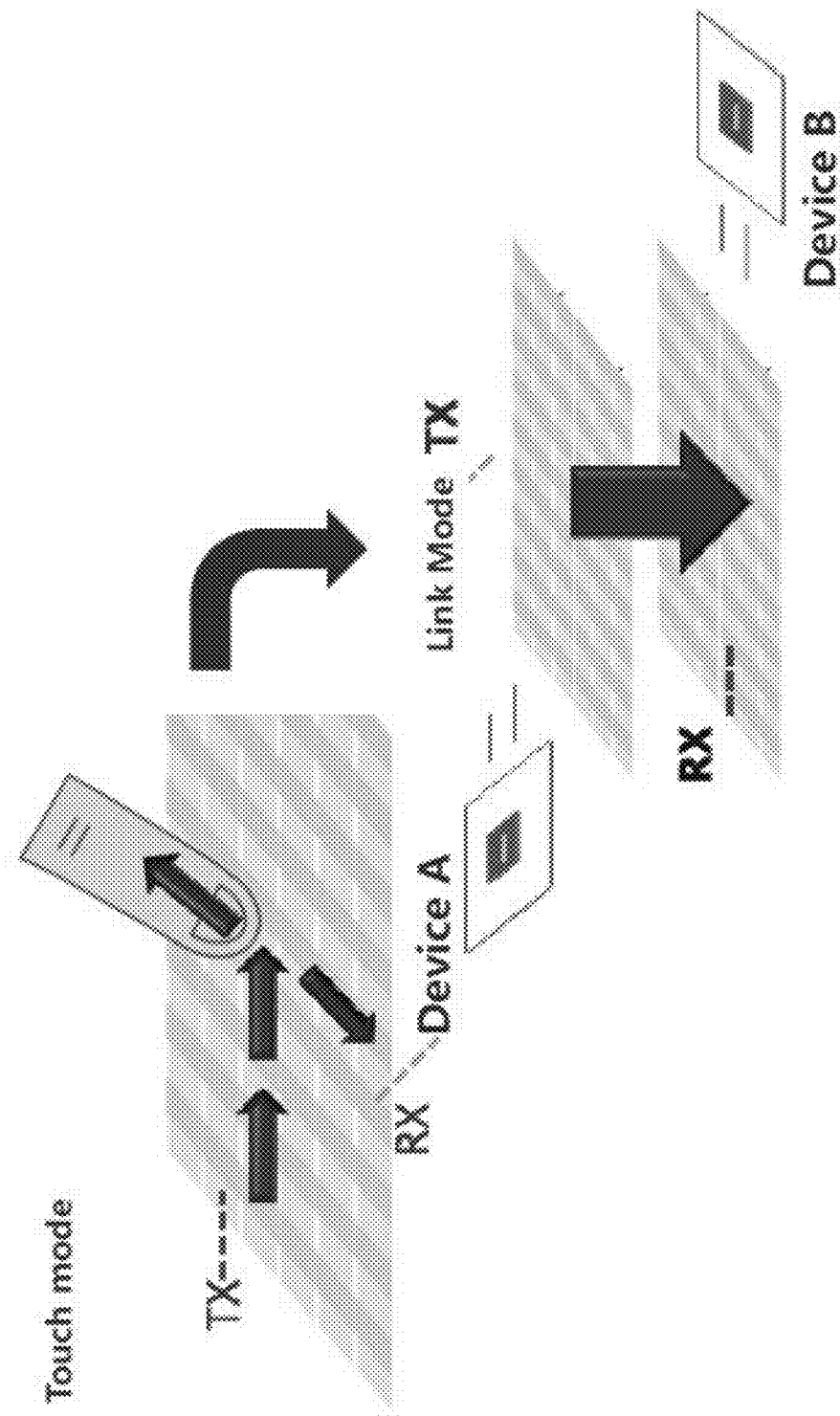
FIG. 13 is a diagram illustrating the use of the link protocol to communicate between Device A and Device B.
Figure 14:
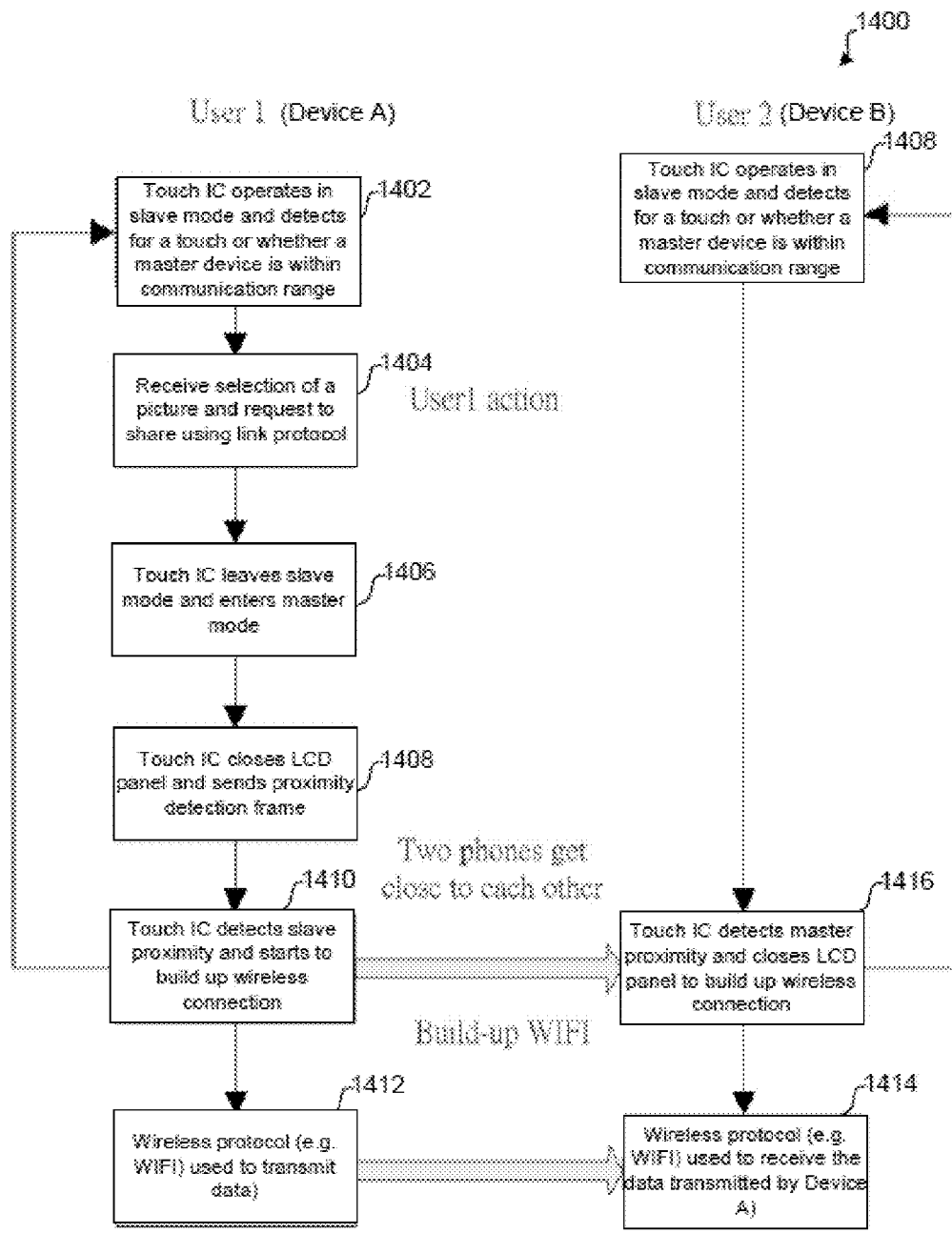
FIG. 14 is process flow diagram of a process using the link protocol to communicate between Device A and Device B.

In another aspect of the disclosed technology, a link protocol for linking between two touch-sensing devices is disclosed. The link protocol uses proximity detection and adaptive modulation. FIG. 13 is a diagram illustrating the use of the link protocol to communicate between Device A and Device B. In FIG. 13, the touch mode of operation and the link mode of operation are shown. FIG. 14 is process flow diagram of a process 1400 using the link protocol to communicate between Device A and Device B. The process 1400 is described with respect to both FIGS. 13 and 14. User1 (Device A) can share a picture with User2 (Device B) using the link protocol. At Device A, the Touch IC operates in the slave mode and continues to detect for a touch or whether a master device is within communication range of Device A (1402). Similarly at Device B of User2, the Touch IC of Device B At Device A Touch IC operates in slave mode and detects for a touch or whether a master device is within communication range of Device 2 (1408). At Device A, a selection of a picture to share is received and a request to share the selected picture is also received (1404). At Device A, the Touch IC leaves the slave mode and enters master mode (1406). At Device A, the Touch IC closes the LCD panel and sends proximity detection frame (1408). As Device A and Device B are placed physically close together to share the selected picture, at Device A, the Touch IC of Device A detects a presence of a slave device within communication range and starts to build up a wireless connection, such as WIFI, Bluetooth, or other short range wireless communication (1410). Similarly at Device B, the Touch IC closes the LCD panel and starts to build up a wireless connection, such as WIFI, Bluetooth, or other short range wireless communication (1416). At Device A, wireless protocol (e.g. WIFI) is used to transmit data to Device B (1412). At Device B, the wireless protocol (e.g. WIFI) is used to receive the data transmitted by Device A (1414).

The link protocol used in FIGS. 13 and 14 is a Half-duplex communications system. Four Frequency Shift Keying (4-FSK) is used for data modulation with two additional FSK used for physical layer protocol control. Proximity detection of a slave or master device within communication range is used to guarantee reliable connections. Also, adaptive modulation can be used to improve Bit-Error-Rate (BER).

Figure 15:
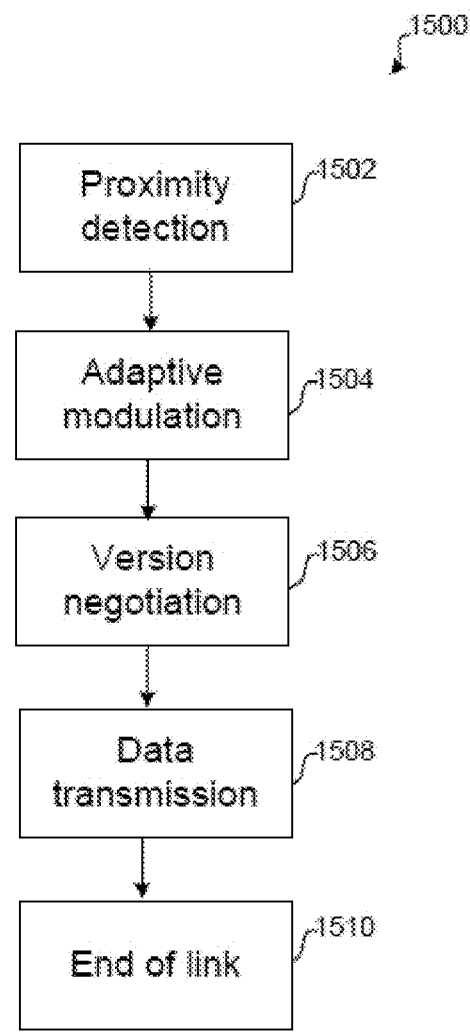
FIG. 15 is a process flow diagram showing an exemplary process of communicating between two devices.

FIG. 15 is a process flow diagram showing an exemplary process 1500 of communicating between two devices. Proximity detection is performed to guarantee a reliable connection (1502). Adoptive modulation is performed to improve the BER (1504). Version negotiation is performed to establish the communication link (1506). Using the established communication link, data transmission is performed (e.g., sharing the picture) between the connected devices (1508). The communication link ends after the data transmission is completed (1510).

Figure 16A:
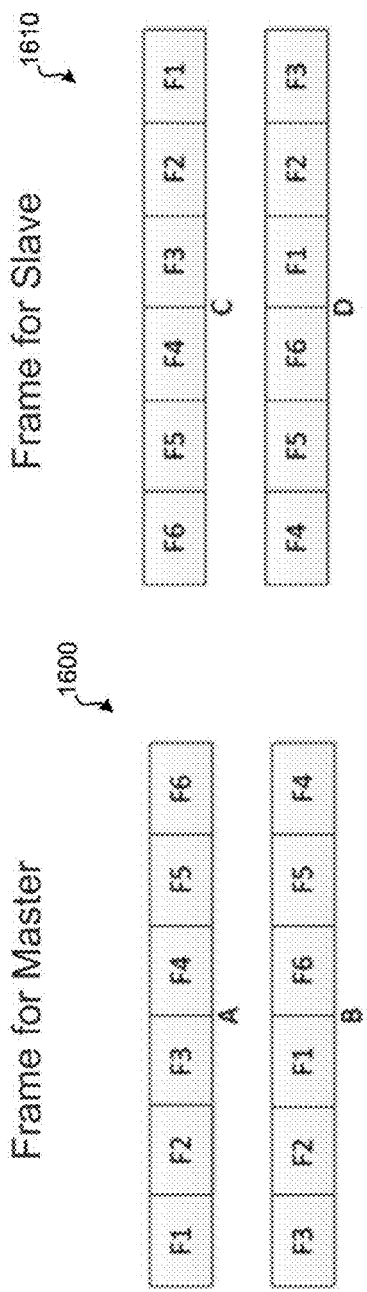
FIG. 16A shows an exemplary frame for a master device and an exemplary frame for a slave device.
Figure 16B:
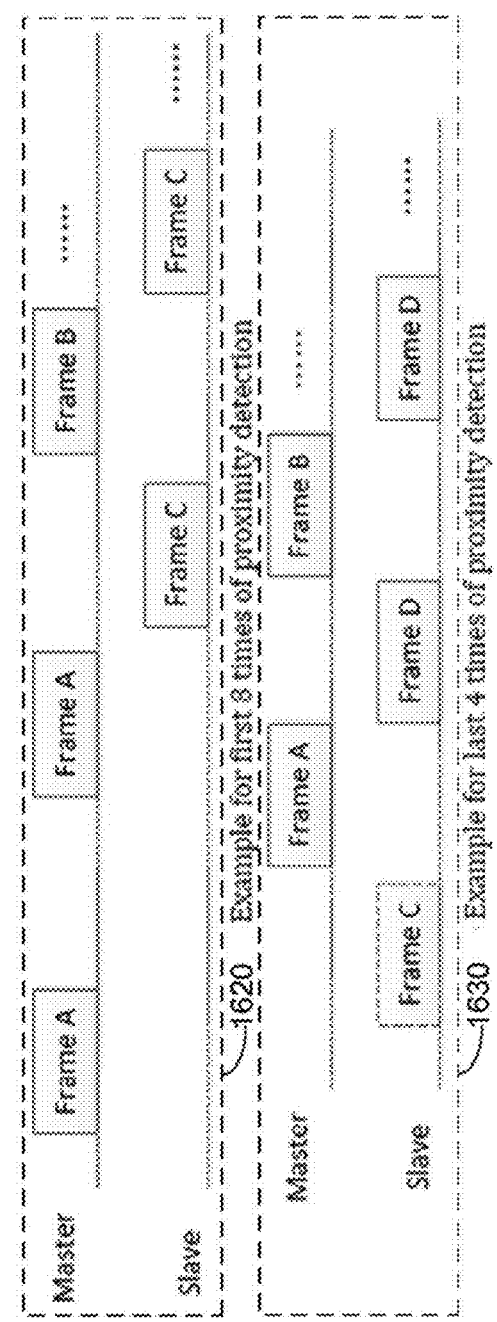
FIG. 16B shows exemplary frames for the master and slave devices during the first 8 proximity detection and exemplary frames for the last 4 proximity detection.

FIG. 16A shows an exemplary frame 1600 for a master device and an exemplary frame 1610 for a slave device. FIG. 16B shows exemplary frames 1620 for the master and slave devices during the first 8 proximity detection and exemplary frames 1630 for the last 4 proximity detection.

Figure 17B:
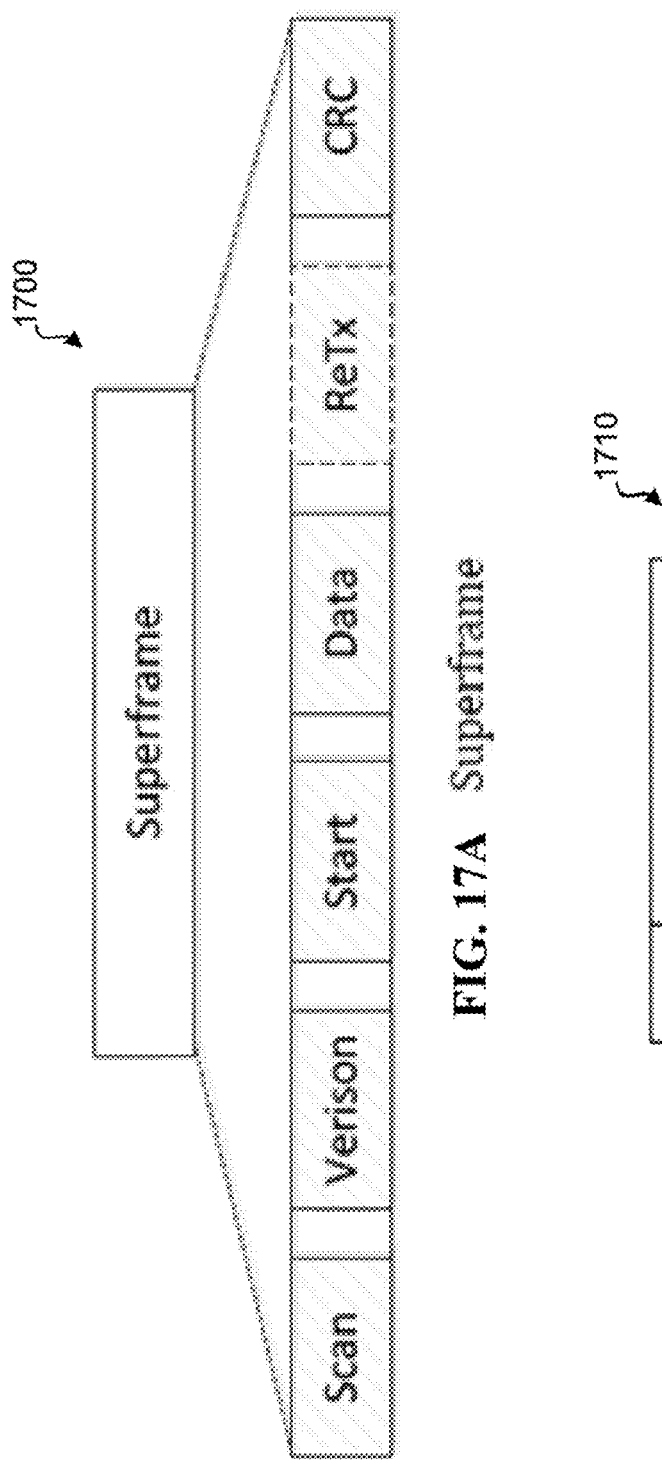
FIG. 17B shows exemplary carrier frequencies for available frequency negotiation.

FIG. 17A shows an exemplary superframe 1700 and FIG. 17B shows exemplary carrier frequencies 1710 for available frequency negotiation. The superframe 1700 includes the frames for Scan, Version, Start, Data, Retransmission (ReTx), and Cyclic Redundancy Check (CRC). Negotiation is performed for the available frequency. In addition, the 4-FSK frequencies and the additional 2 frequencies for physical layer control are defined. In some implementations, a dedicated link function block can be implemented.

Touch IC Hardware

The Touch IC hardware can include a sine wave transmitter and a 4-FSK FM demodulator. The Touch IC hardware can perform noise detection for LCD and common noise.

When the TX transmits a square wave to a channel, the TX harmonic may be able to influence the other communication, such as FM radio, GSM, etc. A spectrum mask can be defined to test the influence in an TOT test procedure. Because the TX may transmit 6 different frequencies, 6 frequencies are demodulated simultaneously. More FM symbols are used to increase the data rate. Phase modulation is avoided due to its higher complexity.

Because the noise sources tend to change under the mobile phone environment, a frequency that is clear of noise and interference is identified and used to guarantee the communication quality. The 'clear' frequency can be identified by monitoring the noise over the frequency subset defined by the disclosed technology.

The Touch IC hardware functions as described can be combined with the original touch functions. In some implementations, the architecture of touch is not changed to retain the original touch functions.

Link Module

Figure 18:
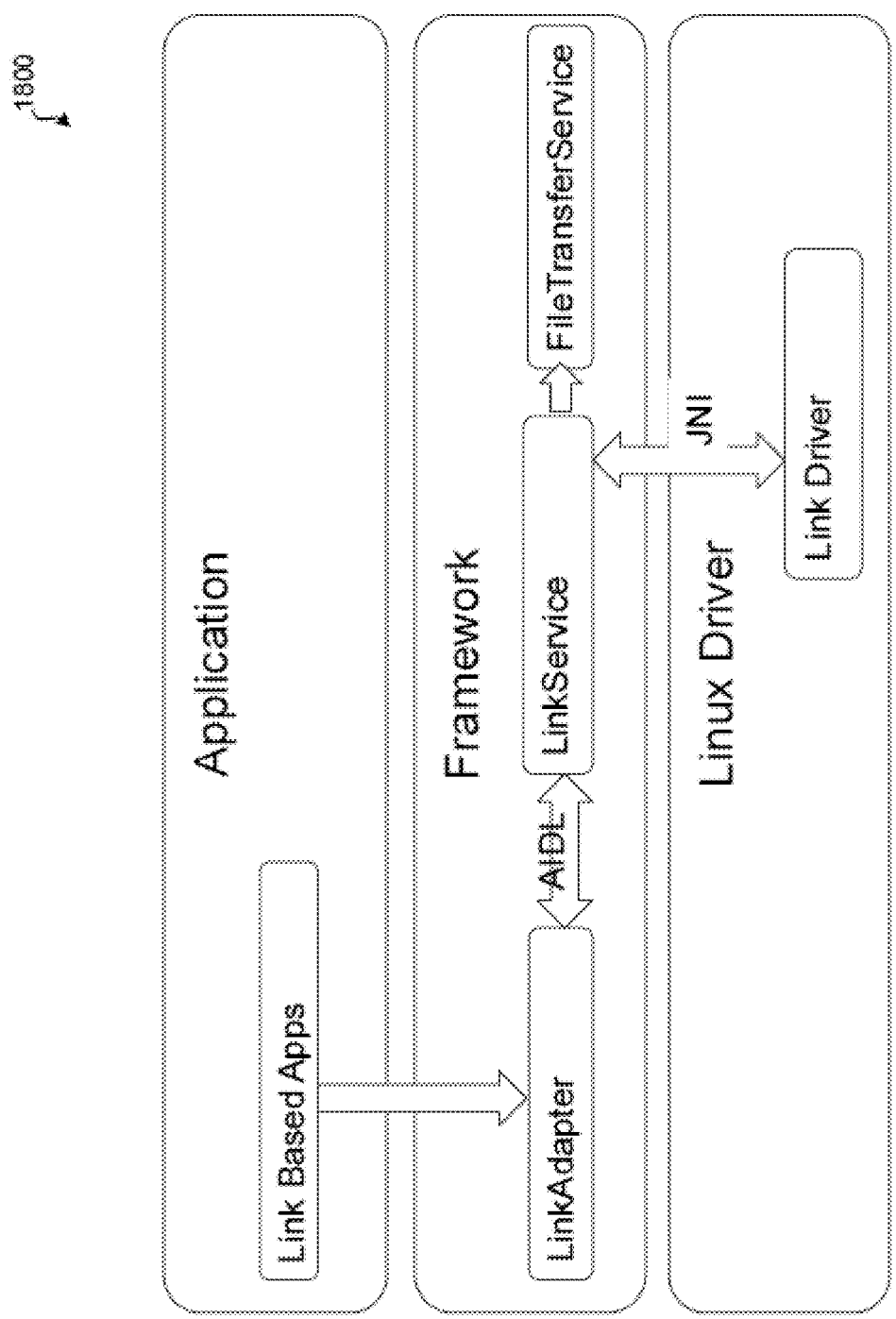
FIG. 18 is a block diagram of an exemplary Link Module.

FIG. 18 is a block diagram of an exemplary Link Module 1800. The Link Module 1800 includes a LinkAdapter that connects the framework to the application. The framework also includes a LinkService that connects the framework to the Linux Driver. The framework also includes FileTransferService that couples to the LinkService.

The LinkAdapter is a local device link adapter. The LinkAdapter allows applications to perform fundamental Link task, such as enable/disable Link, and send data. The LinkService chooses the transfer protocol from the proprietary Link, Bluetooth, WIFI hotspot and WIFI direct based on the final size of the file. For Bluetooth, WIFI hotspot and WIFI direct, the Link just needs to send the pairing information, in order to achieve Bluetooth, WIFI hotspot or WIFI direct auto pairing. The controller of the Link can also control proximity detection and includes a data transfer unit. The FileTransferService is used to transmit big files using Bluetooth, WIFI hotspot or WIFI direct.

Figure 19:
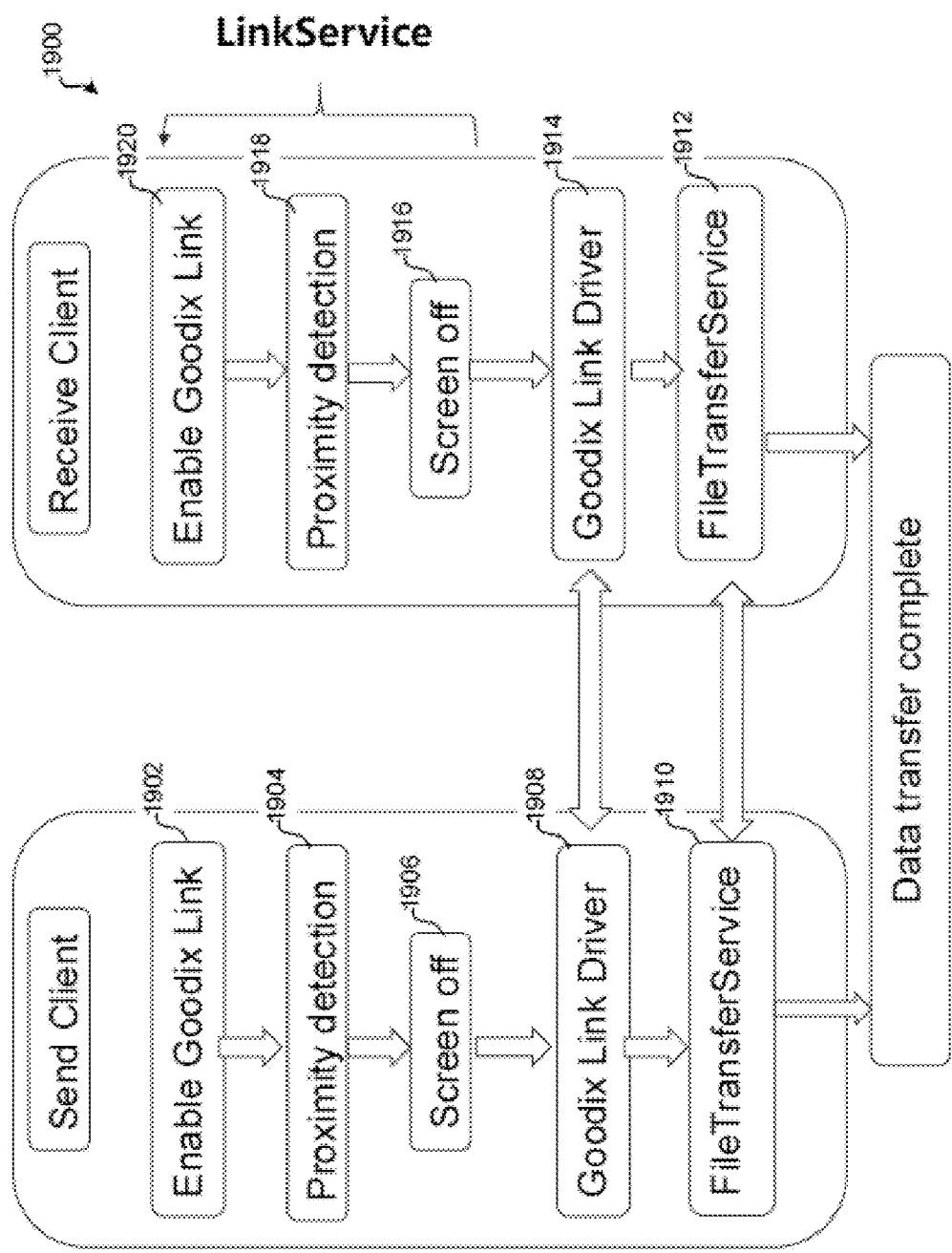
FIG. 19 is a block diagram showing an exemplary process for performing data transfer using the Link Module between a send client device and a receive client device.

FIG. 19 is a block diagram showing an exemplary process 1900 for performing data transfer using the Link Module between a send client device and a receive client device. At the send client device, the Link Module is enabled (1902). Similarly, at the receive client device, the Link Module is enabled (1920). At the send client device, the proximity detection is performed (1904). Similarly at the receive client device, the proximity detection is performed (1918). At the send client device, the screen is turned off (1906). Similarly at the receive client device, the screen is turned off (1916). At the send client device, the Link Driver is enabled (1908). Similarly at the receive client device, the Link Driver is enabled (1914). The respective Link Drivers enables a communication link. At the send client device, the FileTransferService is enabled to perform data transfer (1910). In coordination, at the receive device, the FileTransferService is enabled to perform reception of the transmitted data from the send client device (1912).

Wearable Devices

FIG. 20 is a diagram of an exemplary wearable device 2000. The wearable device in FIG. 20 is shown as a smartwatch. The smartwatch 2000 can communicate with a host device 2050, such as a smartphone to perform a number of functions including using a combination of sensors to continuously collect data associated with a user wearing the smartwatch 2000. The smartwatch 2000 include a display module 2002 for displaying information to the user. The display module 2002 can display text and graphic information on the face of the smart watch, and can be implemented using an organic light emitting diode (OLED) display or E-ink display.

The display module 2002 can optionally include an integrated touch sensor for receiving touch input from a user wearing the smartwatch 2000. When included with the display module 2002, the touch sensor on the display can be implemented as an ultra-low power touch sensor that can be always turned on or active to detect touch signals. The touch sensor can continuously touch gestures, such as slide cross, z shape slide, or single or double tap, etc. The touch sensor can also detect rotational slide on the edge of the smart watch, like the wheel slider on the edge of a regular watch, and is particular useful for a round shape watch face.

The smartwatch 2000 can include one or more motion sensors 2004 such as a 3D accelerometer (e.g., G Sensor) 2006 and an altimeter 2008 for collecting movement and position data of the smart watch 100 worn on the user. The smartwatch 2000 includes one or more biometric sensors 2010 such as a heart rate (HR) sensor 2012 and a cuff-less blood pressure (BP) sensor 2014 for collecting biometric data from the user wearing the smartwatch 2000 such as heart rate and blood pressure. In one example, the cuff-less BP sensor 2014 can be implemented using two sensors positioned a predetermined distance apart to allow measurement of the blood flow rate between the know two points. The biometric sensors 2010, 2012 and 2014 are located on the back of the smartwatch 2000 so as to be in contact with skin of the user wearing the smartwatch 2000. The ultra-low power HR sensor 2012 can be an optical sensor located on the back of the smart watch, which makes direct contact with the user's skin, and always-on to continuously monitor the user's heart rate. A low power G sensor 2006 on the smartwatch 2000 can stay powered on constantly (i.e., always-on) to monitor the smart watch's physical activities.

The motion and biometric sensors 2004, 2006, 2008, 2010, 2012 and 2014 are controlled by a processor, such as a microcontroller (MCU) 2016 or a microprocessor to turn the motion and biometric sensors on/off, process collected sensor data and transmit the collected and processed sensor data through a wireless radio 2018 such as a low energy Bluetooth (BLE) radio to an external device, network, cloud, etc. A battery (not shown) powers the smartwatch 2000 and is rechargeable. The rechargeable battery can provide smart watch's normal operation for at least one full day. The smartwatch 2000 also includes a real-time clock 2020 such as in a form of an integrated circuit to keep track of current time.

An AP processor 2022 can be provided to integrate the MCU 2016, real-time clock (RTC) 2020, motion sensors 2004 (including 3D accelerometer 2006 and altimeter 2008), biometric sensors 2010 (including HR sensor 2012 and BP sensor 2014), wireless radio 2018, such as BLE radio and battery.

Continuous Combined Sensing

The motion and biometric sensors 2004, 2006, 2008, 2010, 2012 and 2014 in the smartphone 2000 are low-powered (i.e., consumes low power) and thus can be always on to obtain continuous sensor readings. Continuous sensor readings from the motion and biometric sensors 2004, 2006, 2008, 2010, 2012 and 2014 allow the smartwatch 2000 to obtain a historical sensor data and avoid missing an important motion and biometric event. In addition, the continuous sensor readings from a combination of sensors allow the smartwatch 2000 to make a more accurate analysis of the recorded sensor data, and predictions about the user wearing the smartwatch 2000 based on the analyzed sensor data. In addition, using sensor readings from a combination of sensors as a trigger to enable an event, operation or mode can prevent accidental triggering of an event, operation or mode by the user. Moreover, the continuous sensor readings from a combination of the motion and biometric sensors 2004, 2006, 2008, 2010, 2012 and 2014 allow the smart watch to customize the sensor data analysis and feedback for the user wearing the smartwatch 2000.

In addition to recording the collected sensor data, the smartwatch 2000 can perform various operations in response to input received from a combination of motion and biometric sensors. Specifically, the MCU 2016 is in communication with the motion and biometric sensors 2004, 2006, 2008, 2010, 2012 and 2014 to perform various operations in response to the collected sensor data from a combination of the sensors. For example, responsive to sensor data received from a combination of the motion and biometric sensors, the MCU 2016 can change the operational mode of the smartwatch 2000. Examples of the sensor data received from a combination of sensors can include the following:

1. Combination of a signal from the G sensor and a signal from a heart rate sensor.
2. Combination of a signal on the G sensor that indicates a swing motion of user's arm for the user to see the smart watch and a signal from an optical sensor to confirm the user is maintaining eye-focus on the smart watch. In addition, an option to continuously keep the watch in a new mode or switch the smart watch to standby or standard mode in absence of positive optical sensor signal.

When the display module 2002 is implemented to include an integrated touch sensor array, the following combinations of different sensor readings can be used to change between different operational modes.

1. Combination of a tap/touch on the touch screen and a signal from the G sensor.
2. Combination of a gesture on the touch sensor and a signal on the G sensor.
3. Combination of gestures on the touch sensor.
4. Combination of a double tap/touch on the touch sensor and a signal from the G sensor.
5. Combination of a signal on the G sensor that indicates a swing motion of user's arm for the user to see the smart watch and an option to continuously keep the watch in a new mode or switch the smart watch to standby or standard mode after a predetermined time duration without a touch sensor input.
6. Combination of another signature input from the G sensor, such as a simple shake of the smart watch (e.g., shake of user's arm) within a predetermined time duration after the detection of the first signature input from the G sensor, such as a single or double tap/touch on the connected/smart/correlated watch.

Based on the analysis of sensor data combinations described in the above examples, the smartwatch 2000 can switch to operate between multiple operation modes.

The smartwatch 2000 can include various features including a low power mode for being always-on and detecting user gestures, and a normal mode with a high accuracy, such as +/−1 mm. The Standby Mode of the smartwatch 2000 includes wait interrupts, a wakeup timer, a real-time timer, and consumes less than 10 µA of power. The Low Power Mode of the smartwatch 2000 is used to recognize basic gestures including: taps, swipes, and simple symbols. The power consumption is less than 50 µA. The Normal Mode provides an accurate touch, such as +/−1 mm and has a refresh rate of greater than or equal to 60 Hz refresh rate. The power consumption is less than 200 µA. The Sensor Hub Mode is used to recognize basic gestures from G sensor: taps, swings, and jumps. The power consumption is less than 50 µA. The Link Mode is optional and can implement various operations with the smartphone. The power consumption: is less than 500 µA.

Another feature is the Ultra-low power operation to allow the smartwatch 2000 to be always-on to report user heart rate and combined G-sensor data for motion resistance, for example. The Standby Mode includes wait interrupts and a wakeup timer. The power consumption is less than 5 µA. The Data Reporting Mode is used to measure heart rate and report data. The power consumption is less than 150 µA. The Data Recording mode is used to measure heart rate and record data. The power consumption is less than 160 µA.

In addition, the smartwatch 2000 can include various additional features. For example, the support hard cover for the smartwatch 2000 can be up to 400 μm. The sensors used in the smartwatch 200 can vary in size and type. The touch sensor can support sensitivity to pressure and speed of touch. The smartwatch 2000 can support various communication protocols including the proprietary Link Protocol and other standardized communication protocol, such as NFC. AMOLED On-Cell touch solution can provide the touch sensing capabilities.

Exemplary Connection for Wearable Devices

Wearable devices, such as the smartwatch 2000 can communicatively connect with a host device, such as a smartphone or other wearable devices using various connection types. For example, basic connection can be used to simplify Bluetooth (BT) connection between a smartphone and the smart watch 2000. Also, the smartwatch OOBE can be simplified on the smartphone.

Figure 21A:
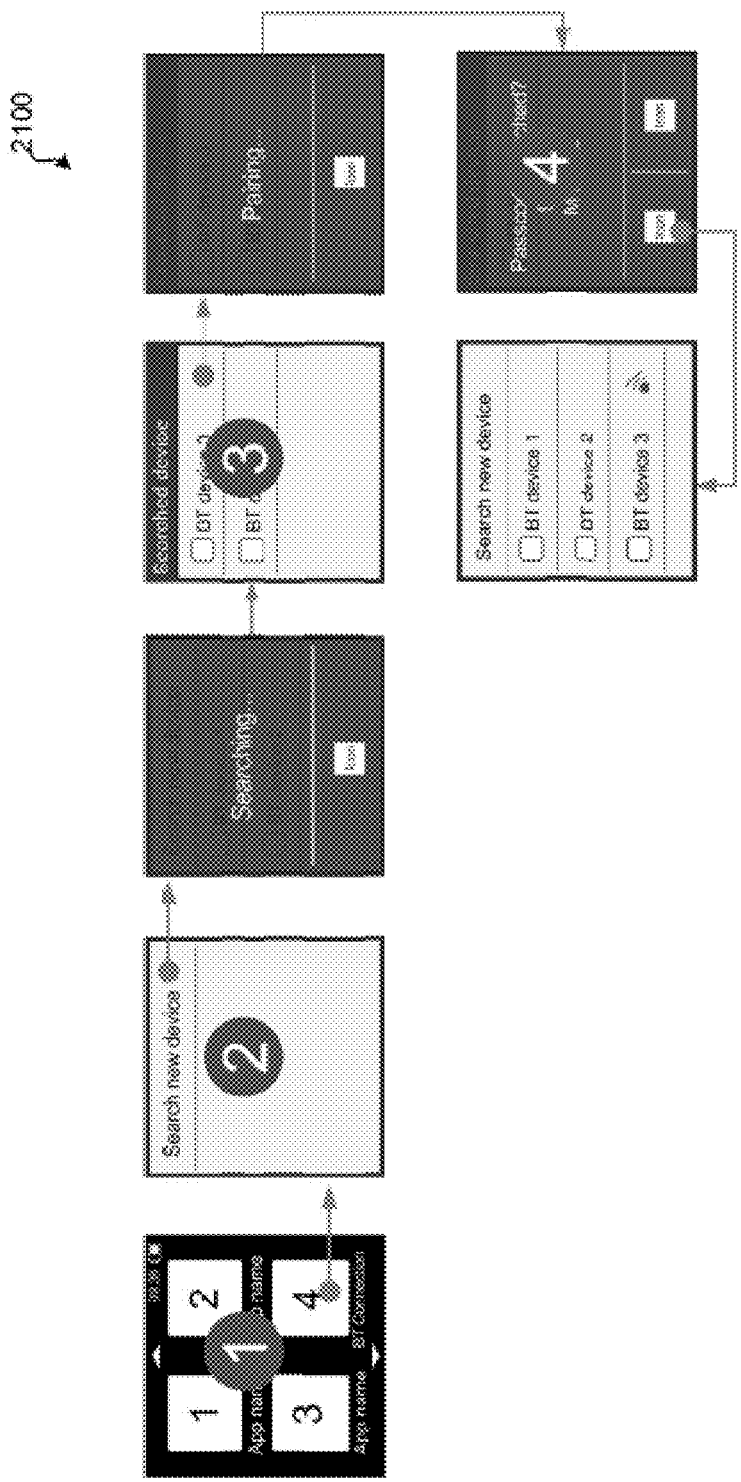
FIG. 21A is a diagram showing an exemplary BT Connection Flow for connecting a new device.

FIG. 21A is a diagram showing an exemplary BT Connection Flow 2100 for connecting a new device. Reference numbers 1, 2, 3, and 4 show the connection flow for connecting a new device using BT connection.

Figure 21B:
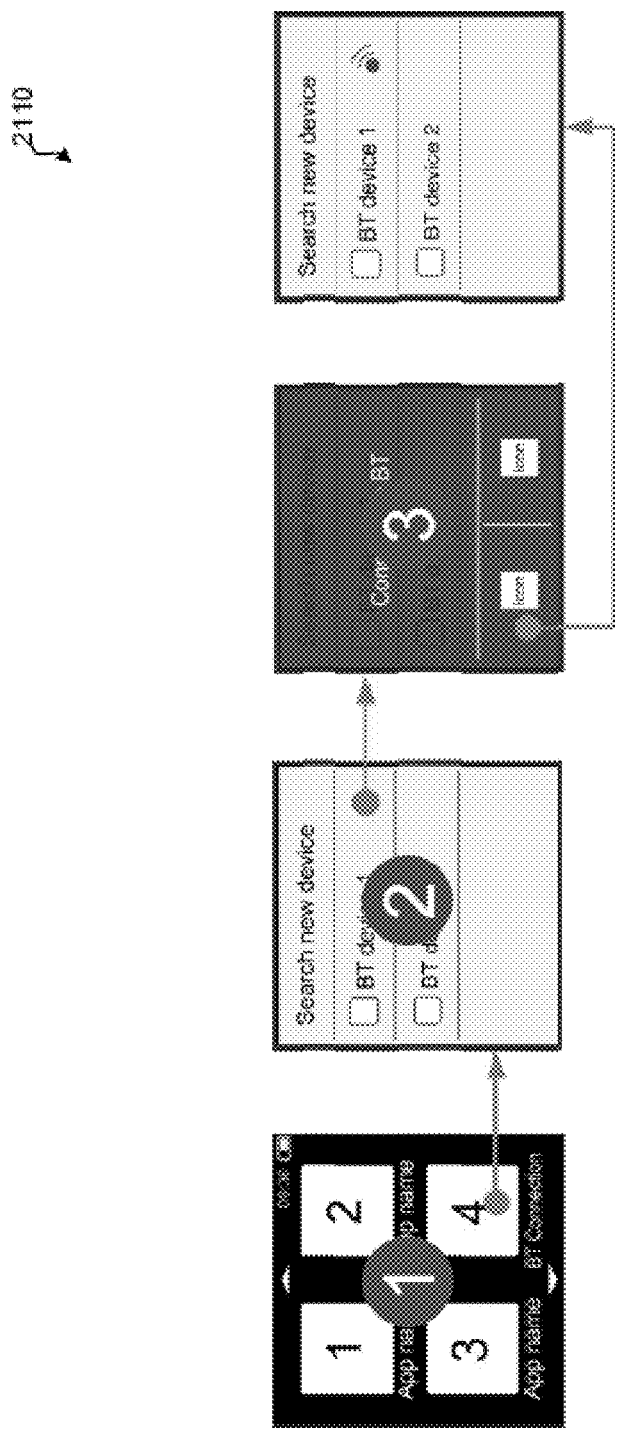
FIG. 21B is a diagram showing an exemplary BT Connection Flow for connecting a PAIRED device.

FIG. 21B is a diagram showing an exemplary BT Connection Flow 2110 for connecting a PAIRED device. Reference numbers 1, 2, and 3 show the connection flow for connecting a PAIRED device.

Figure 21C:
FIG. 21C is a diagram showing an exemplary HotKnot BT Connection Flow.

FIG. 21C is a diagram showing an exemplary HotKnot BT Connection Flow 2120. FIG. 21D is a diagram showing an exemplary easy smartwatch OOBE 2130.

Embodiments described in this document provide devices, systems, and techniques that implement various fingerprint detection modules for human fingerprint detection and authentication. Moreover, embodiments described in this document provide devices, systems, and techniques that implement various fingerprint detection modules including an optical sensing unit to determine if a detected object is human. Specifically, the technology disclosed in this document uses an additional measurement obtained from a person to combine with the person's fingerprint pattern as a combination authentication method to identify whether the authorized person is accessing the device.

In addition, Embodiments described in this document and attached Appendix provide a smart watch that includes hardware and software necessary to obtain motion and sensor data from a user wearing the smart watch. The described smart watch can continuously collect sensor data from the user and combine the sensor data from multiple sensors to enhance the accuracy of the sensor data analysis and provide relevant feedback information to the user. In addition, the described smart watch is capable of pairing with an external personal portable device, such as a smartphone or tablet to correlate the collected sensor data with activities performed by the user on the paired device. The smart device can also transmit data to a cloud server to collect sensor data and correlation analysis data for further analysis and provide statistical analysis of the collected sensor data and correlation analysis data.

While this present disclosure contains many specifics, these should not be construed as limitations on the scope of any invention or of what may be claimed, but rather as descriptions of features that may be specific to particular embodiments of particular inventions. Certain features that are described in this present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this present disclosure should not be understood as requiring such separation in all embodiments.

Only a few implementations and examples are described and other implementations, enhancements and variations can be made based on what is described and illustrated in this present disclosure.

What is claimed is:

1. A secure mobile device comprising:
   a transparent top cover;
   a touch panel configured to receive touch input, the touch panel disposed below the transparent top cover; and
   a fingerprint detection module configured to capture an image of a finger making contact with the fingerprint detection module, the fingerprint detection module including:
     a top cover;
     a sensor array disposed below the top cover and arranged in columns of sensor pixels;
     integrating circuitry communicatively coupled to the sensor array and configured to simultaneously integrate sensor data received from multiple columns of sensor pixels;
   wherein the fingerprint detection module is configured to operate in a registration mode and an authentication mode, in the registration mode the image of the finger making contact with the fingerprint detection module is captured when the finger swipes across the fingerprint detection module, and in the authentication mode the image of the finger making contact with the fingerprint detection module is captured when the finger touches the fingerprint detection module.

2. The secure mobile device of claim 1, wherein the fingerprint detection module includes a processor configured to identify a frequency to avoid a noise source.

3. The secure mobile device of claim 1, wherein the fingerprint detection module is configured to operate in the registration mode to capture a sequence of partial fingerprint images and stitch the sequence of partial fingerprint images together as a registered fingerprint image.

4. The secure mobile device of claim 3, comprising a memory module configured to store the registered fingerprint image.

5. The secure mobile device of claim 3, wherein the fingerprint detection module is configured to extract features from the sequence of partial fingerprint images and use the extracted features to stitch the sequence of partial fingerprint images together as a registered fingerprint image.

6. The secure mobile device of claim 1, wherein the fingerprint detection module is configured to operate in the registration mode to capture a sequence of partial fingerprint images when the finger swipes across the fingerprint detection module.

7. The secure mobile device of claim 1, wherein the fingerprint detection module is configured to operate in the authentication mode to capture a partial fingerprint image.

8. The secure mobile device of claim 7, wherein the fingerprint detection module is configured to operate in the authentication mode to capture the partial fingerprint image when the finger touches the fingerprint detection module.

9. The secure mobile device of claim 7, wherein the fingerprint detection module is configured to operate in the authentication mode to compare the captured partial fingerprint image with the stored registered image to determine a match.

10. The secure mobile device of claim 9, wherein the fingerprint detection module is configured to operate in the authentication mode to extract features from the captured partial fingerprint image to compare the extracted features from the captured partial fingerprint image with features in the stored registered image to determine the match.

11. The secure mobile device of claim 10, wherein the extracted features include minutiae.

12. A method of authenticating a fingerprint image, the method including:
    capturing, at a fingerprint detection module, an input fingerprint image to be authenticated;
    extracting features from the captured input fingerprint image;
    comparing the extracted features from the captured input fingerprint image with features from a registered fingerprint image; and
    responsive to the comparing, determining whether the captured input fingerprint image matches the registered fingerprint image,
    wherein the registered fingerprint image is captured when a finger swipes across the fingerprint detection module; and the input fingerprint image to be authenticated is captured when a finger touches the fingerprint detection module.

13. The method of claim 12, wherein extracting the features include extracting minutiae.

14. The method of claim 12, wherein capturing the input fingerprint image includes capturing a single partial fingerprint image.

15. The method of claim 12, wherein the registered fingerprint image is a larger image than the captured input fingerprint image.

* * * * *